(12) United States Patent
Doi et al.

(10) Patent No.: US 6,970,919 B1
(45) Date of Patent: Nov. 29, 2005

(54) METHOD AND SYSTEM FOR NETWORK MANAGEMENT

(75) Inventors: Yoshiko Doi, Kawasaki (JP); Miyuki Sato, Kawasaki (JP); Yujo Kakumi, Nagoya (JP); Atsushi Hattori, Nagoya (JP); Masaki Mishima, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/369,776

(22) Filed: Aug. 6, 1999

(30) Foreign Application Priority Data

Jan. 11, 1999 (JP) ................................ 11-003645

(51) Int. Cl.$^7$ .......................................... G06F 15/173
(52) U.S. Cl. ...................... 709/220; 709/223; 709/224; 345/440; 345/734; 370/254; 725/111
(58) Field of Search ................................ 709/220–224, 709/202, 229; 707/3, 103, 104; 713/201; 345/356, 357, 440, 734; 370/255, 408, 254; 340/506; 725/111

(56) References Cited

U.S. PATENT DOCUMENTS

| | | | |
|---|---|---|---|
| 5,295,244 A * | 3/1994 | Dev et al. ..................... | 345/357 |
| 5,586,254 A * | 12/1996 | Kondo et al. ................ | 707/104 |
| 5,651,006 A * | 7/1997 | Fujino et al. ................ | 370/408 |
| 5,684,957 A * | 11/1997 | Kondo et al. ................ | 713/201 |
| 5,726,979 A | 3/1998 | Henderson et al. | |
| 5,845,277 A * | 12/1998 | Pfeil et al. ....................... | 707/3 |
| 5,848,243 A | 12/1998 | Kulkarni et al. | |
| 5,910,803 A * | 6/1999 | Grau et al. ................... | 345/734 |
| 6,041,347 A * | 3/2000 | Harsham et al. ............. | 709/220 |
| 6,041,349 A * | 3/2000 | Sugauchi et al. ............ | 709/223 |
| 6,047,320 A * | 4/2000 | Tezuka et al. ............... | 709/223 |
| 6,049,828 A * | 4/2000 | Dev et al. .................... | 709/224 |
| 6,067,093 A * | 5/2000 | Grau et al. ................... | 345/440 |
| 6,122,639 A * | 9/2000 | Babu et al. ................... | 707/103 |
| 6,212,559 B1 * | 4/2001 | Bixler et al. ................. | 709/221 |
| 6,271,845 B1 * | 8/2001 | Richardson .................. | 345/356 |
| 6,286,039 B1 * | 9/2001 | Van Horne et al. .......... | 709/221 |
| 6,289,380 B1 * | 9/2001 | Battat et al. ................. | 709/224 |
| 6,295,527 B1 * | 9/2001 | McCormack et al. .......... | 707/3 |
| 6,308,205 B1 * | 10/2001 | Carcerano et al. .......... | 709/221 |
| 6,308,328 B1 * | 10/2001 | Bowcutt et al. ............. | 725/111 |
| 6,374,293 B1 * | 4/2002 | Dev et al. .................... | 709/220 |
| 6,510,466 B1 * | 1/2003 | Cox et al. .................... | 709/229 |
| 6,553,403 B1 * | 4/2003 | Jarriel et al. ................. | 709/202 |

FOREIGN PATENT DOCUMENTS

| | | |
|---|---|---|
| EP | 0 773 649 | 5/1997 |
| JP | 04-230139 | 8/1992 |
| JP | 4-230139 | 8/1992 |
| JP | 5-326706 | 11/1994 |
| JP | 06-326706 | 11/1994 |
| JP | 8-328979 | 12/1996 |
| JP | 9-135243 | 5/1997 |
| JP | 9-200332 | 7/1997 |

(Continued)

*Primary Examiner*—Saleh Najjar
*Assistant Examiner*—ThuHa Nguyen
(74) *Attorney, Agent, or Firm*—Katten Muchin Rosenman LLP

(57) ABSTRACT

A method of controlling a network, which includes network elements connected via links and provides services, includes the steps of creating view-configuration information based on network-configuration information with respect to each of the services such that the view-configuration information is related to the network-configuration information, and displaying a view based on the view-configuration information with respect to each of the services, the view including both or either one of a physical network configuration of the network and a logical network configuration of the network.

15 Claims, 27 Drawing Sheets

FOREIGN PATENT DOCUMENTS

| | | |
|---|---|---|
| JP | 10-294731 | 11/1998 |
| JP | 11-275074 | 10/1999 |
| WO | 97/23101 | 6/1997 |
| WO | 98/25377 | 6/1998 |

* cited by examiner

FIG.6

| DATABASE ITEM | INFORMATION TO BE COLLECTED FROM NETWORK ELEMENT | CONVERSION METHOD |
|---|---|---|
| NETWORK CONFIGURATION | DETECTING NETWORK ELEMENT | MANUAL ENTRY OF DATA INTO DATABASE (ADDING/DELETING LINK, DELETING NODE) |
| NODE STATUS | FAILURE OF NETWORK ELEMENT·RECOVERY | OBTAINING NODE-FAILURE LEVEL VIA ELEMENT-ACCESS MODULE PROVIDING MATCHES BETWEEN FAILURE CODES AND FAILURE LEVEL, AND UPDATING DATABASE IF THERE IS CHANGE IN NODE-FAILURE LEVEL |
| LINK STATUS | FAILURE OF NETWORK ELEMENT PORT·RECOVERY | OBTAINING LINK -FAILURE LEVEL VIA LOCAL-DOMAIN MANAGER/MULTI-DOMAIN MANAGER PROVIDING MATCHES BETWEEN PORT-RELATED FAILURE CODES AND LINK-FAILURE LEVEL, AND UPDATING DATABASE IF THERE IS CHANGE IN LINK-FAILURE LEVEL |
| CONNECTION ROUTE | CROSS CONNECT | CONNECTING CROSS-CONNECTS TOGETHER. CORRECTING ROUTE INFORMATION IF THERE IS CHANGE IN CROSS CONNECT. DELETING ENTRY FROM DATABASE WHEN NO CROSS CONNECT EXISTS ANY LONGER. |
| CONNECTION STATUS | FAILURE OF NETWORK ELEMENT AND PORT | EXTRACTING CONNECTION FROM ROUTE INFORMATION WHEN CONNECTION RELATES TO FAILURE |

FIG.7

| EVENT | TYPE OF MODIFICATION | COLLECTED ITEM | DESCRIPTION |
|---|---|---|---|
| NODE FAILURE | NODE-STATUS MODIFICATION LINK-STATUS MODIFICATION S-PVC-ROUTE MODIFICATION | NEW ROUTE OF S-PVC CONNECTION THAT HAD ROUTE PASSING THROUGH FAILED NODE/LINK | |
| RECOVERY FROM NODE FAILURE | NODE-STATUS MODIFICATION NODE-CONFIGURATION MODIFICATION LINK-STATUS MODIFICATION | NODE-CONFIGURATION INFORMATION AND ROUTE EXPECTED TO BE LAID OUT IN RESPONSE TO CHANGE IN NODE CONFIGURATION | |
| ADDING CONNECTION | ADDING CONNECTION | ROUTE OF ADDED CONNECTION | |
| MODIFYING CONNECTION | MODIFYING CONNECTION | ROUTE OF MODIFIED CONNECTION | |
| DELETING CONNECTION | DELETING CONNECTION | ROUTE OF DELETED CONNECTION | |
| USER REQUEST | ANY MODIFICATION | REQUESTED ITEM | |

FIG.10A

| DATABASE-ITEM NAME | CONTENTS | DESCRIPTION |
|---|---|---|
| JVvNode | NODE | INFORMATION ON NETWORK ELEMENT |
| JVvLink | LINK | INFORMATION ON COMMUNICATION LINE |
| JVvPort | PORT | ATTRIBUTE INFORMATION ON END PORT OF COMMUNICATION LINE |
| JVvLogicalPort | LOGICAL PORT | ATTRIBUTE INFORMATION ON END POINTS OF CONNECTION |
| JVvConnection | CONNECTION | ATTRIBUTE INFORMATION ON END-TO-END CONNECTION |
| JVvCrossConnect | CROSS CONNECT | INFORMATION ON CONNECTION ROUTE AND DETAILED ATTRIBUTE |

FIG.10B

| DATABASE-ITEM NAME | CONTENTS | DESCRIPTION |
|---|---|---|
| JVvView | VIEW | INFORMATION FOR CONTROLLING EACH VIEW |
| JVvViewDomain | DOMAIN | UNIT OF CONTROL INTO WHICH VIEW IS DIVIDED |
| JVvViewNode | VIEW NODE | NODE REGISTERED AS VIEW-CONFIGURATION INFORMATION |
| JVvViewLink | VIEW LINK | LINK REGISTERED AS VIEW-CONFIGURATION INFORMATION |
| JVvViewEdge | EDGE | VIRTUAL DEVICE AT END OF NETWORK |
| JVvViewConnection | VIEW CONNECTION | CONNECTION REGISTERED AS VIEW-CONFIGURATION INFORMATION |
| JVvViewEndPoint | END POINT | ENDPOINT OF CONNECTION BELONGING TO EDGE |
| JVvViewService Template | SERVICE TEMPLATE | SHARED INFORMATION ABOUT CONNECTION FOR EACH SERVICE |
| JVvViewPhysical FaultOutput | INFORMATION ON PHYSICAL FAIL OUTPUT | RULE ABOUT GUI DISPLAY OF PHYSICAL FAILURE |
| JVvViewService FaultOutput | INFORMATION ON SERVICE FAIL OUTPUT | RULE ABOUT GUI DISPLAY OF SERVICE FAILURE |

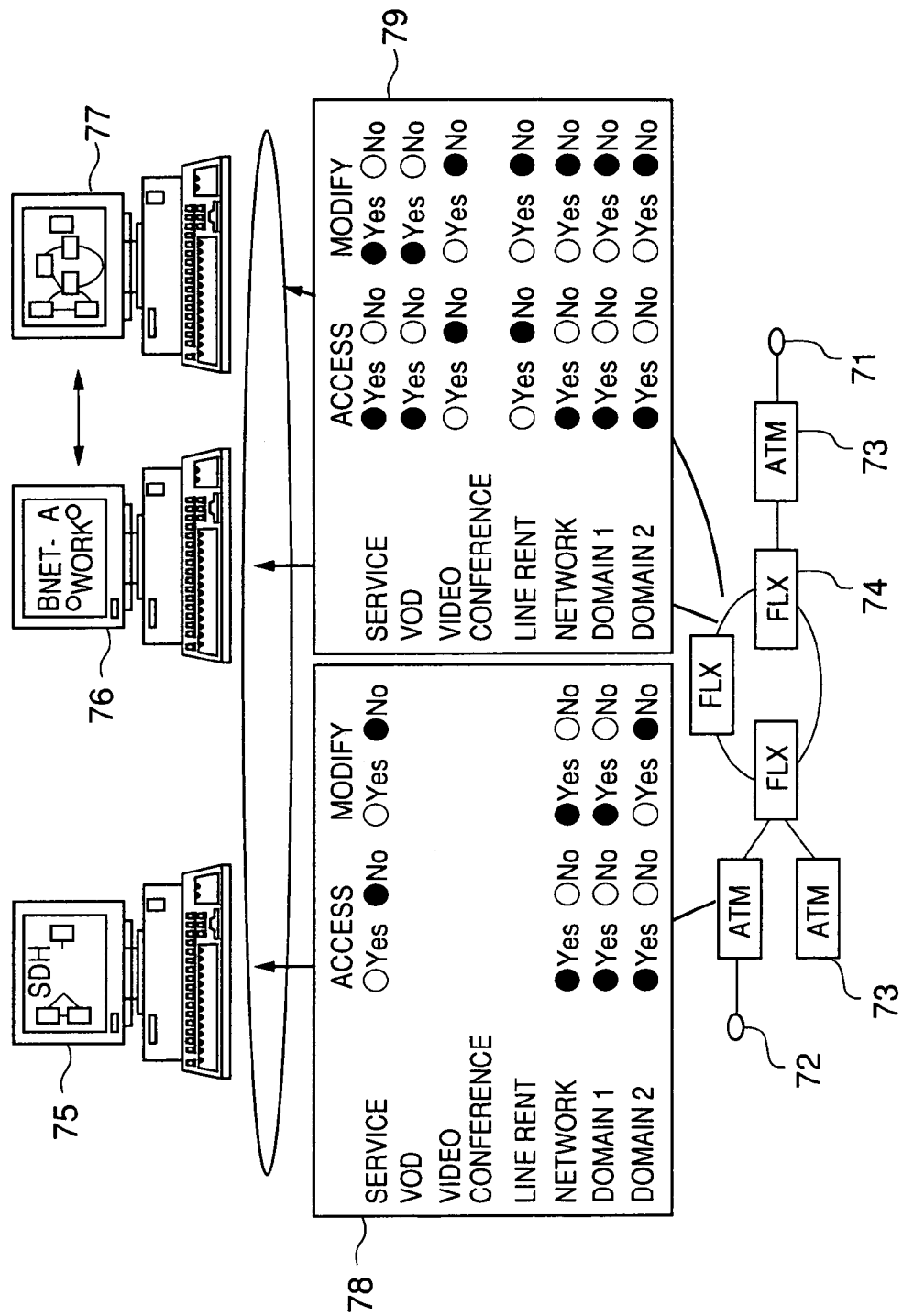

FIG.15A

| FAILURE LEVEL | FAILURE NAME | ICON NAME | ALARM-SOUND ID |
|---|---|---|---|
| -1 | UNCERTAIN | GRAY | 0 |
| 0 | NORMAL | GREEN | 0 |
| 1 | WARNING | YELLOW | 1 |
| 2 | MINOR FAILURE | ORANGE | 2 |
| 3 | SERIOUS FAILURE | RED | 3 |

FIG.15B

| FAILURE LEVEL | FAILURE NAME | ICON NAME | ALARM-SOUND ID |
|---|---|---|---|
| -1 | UNCERTAIN | GRAY | 0 |
| 0 | NORMAL | GREEN | 0 |
| 1 | FAILURE | RED | 1 |

FIG.16

| FAILURE LABEL | PHYSICAL FAILURE LEVEL | SERVICE FAILURE LEVEL |
|---|---|---|
| RECOVERY FROM CLOCK FAILURE | 0 | 0 |
| CLOCK FAILURE | 3 | 1 |
| RECOVERY FROM POWER FAILURE | 0 | 0 |
| POWER FAILURE | 3 | 1 |
| RECOVERY FROM UPS FAILURE | 0 | 0 |
| UPS FAILURE | 3 | 1 |
| RECOVERY FROM FAN FAILURE | 0 | 0 |
| FAN FAILURE | 2 | 0 |
| RECOVERY FROM HARD-DRIVE FAILURE | 0 | 0 |
| HARD-DRIVE FAILURE | 3 | 1 |
| RECOVERY FROM RTC FAILURE | 0 | 0 |
| RTC FAILURE | 3 | 1 |
| RECOVERY FROM TEMPERATUR FAILURE | 0 | 0 |
| TEMPERATUR FAILURE | 2 | 0 |
| RECOVERY FROM EEPROM FAILURE | 0 | 0 |
| EEPROM FAILURE | 3 | 1 |
| RECOVERY FROM STANDBY FAILURE | 0 | 0 |
| STANDBY FAILURE | 2 | 0 |
| RECOVERY FROM Sbus FAILURE | 0 | 0 |
| Sbus FAILURE | 3 | 1 |
| RECOVERY FROM Sbus FAILURE | 0 | 0 |
| Sbus FAILURE | 3 | 1 |
| RECOVERY FROM PORT FAILURE | 0 | 0 |
| PORT FAILURE | 3 | 1 |

METHOD AND SYSTEM FOR NETWORK MANAGEMENT

BACKGROUND OF THE INVENTION

1. Field of the Invention

The present invention relates to a network-management method and a network-management system for controlling a network that provides various services.

In a certain network configuration, a plurality of nodes (e.g., switches and ATM switches) and cross-connection devices are connected via physical communication lines, and logical paths are established with respect to various services for providing audio, image, and data. In a large-scale network, a plurality of communication-service providers may offer services. In such a case, it is expected to be able to control network with respect to each service or with respect to each communication-service provider.

2. Description of the Related Art

There are various proposed schemes for connecting LANs (local area networks) and WANs (wide area networks) together to create a large-scale network and for controlling the created large-scale network. In general, a large-scale network is implemented by employing multi-vendor network elements. Further, the large-scale network may be managed by a single communication-service provider, or may be created and managed by a plurality of communication-service providers. Against this background, there is a scheme for dividing a large-scale network into segments and giving a hierarchical structure to these segments, allowing each network segment to be displayed separately for management purposes and allowing connections inside each segment to be controlled. An example of such a scheme is disclosed in Japanese Patent Laid-open Application No. 6-326706, for example.

Another scheme allows only an administrator of a network of a given communication-service provider to store virtual view information in a table form for the purpose of controlling the network. This scheme allows the administrator to attend to network management while insuring overall security between different communication-service providers. An example of such a scheme is disclosed in Japanese Patent Laid-open Application No. 4-230139.

Further, there is a scheme for controlling network by displaying network nodes on a screen by use of colors for indication of network conditions, interface-connection conditions, and so on, and by providing a beeping function using different beep sounds. When the network fails, a location of the failure is reported to a network administrator by displaying the location in a different color and producing an alarming sound. Also, there is a scheme for controlling network by utilizing GUI (graphical user interface). Icons and pull-down selections are used for obtaining MIB (management information base) information, for example, thereby allowing visual evaluation of current network conditions.

A network uses physical communication lines, switches, ATM switches, etc., to connect between terminals and also between terminals and information providers, and renders various services for transmission of audio data and/or image data, the Internet, CBR (constant bit rate) transmission, VBR (variable bit rate) transmission, etc. In a related-art network, conditions of physical communication lines and nodes such as switches and ATM switches are displayed on a management screen, thereby allowing a network administrators to spot a network failure. In this configuration, however, network conditions cannot be controlled on a service-wise basis. Further, it is not easy to evaluate whether a spotted network failure severely affects the services.

Settings of connections for providing services are usually made by entering commands. When a network includes multi-vendor network elements, various commands need to be provided so as to cope with each of different network elements. Because of this, it is undesirably difficult to set connections in a service-wise manner.

Accordingly, there is a need for a network-management method and a network-management system which allow control and settings to be easily made with respect to each of different services by providing a physical network structure and a logical network structure on a service-wise basis.

SUMMARY OF THE INVENTION

Accordingly, it is a general object of the present invention to provide a network-management method and a network-management device which can satisfy the need described above.

It is another and more specific object of the present invention to provide a network-management method and a network-management system which allow control and settings to be easily made with respect to each of different services by providing a physical network structure and a logical network structure on a service-wise basis.

In order to achieve the above objects according to the present invention, a method of controlling a network, which includes network elements connected via links and provides services, includes the steps of creating view-configuration information based on network-configuration information with respect to each of the services such that the view-configuration information is related to the network-configuration information, and displaying a view based on the view-configuration information with respect to each of the services, the view including both or either one of a physical network configuration of the network and a logical network configuration of the network.

In the method as described above, views including physical network configurations and/or logical network configurations are presented to a user (i.e., a network administrator or a service administrator) to allow the network to be controlled on a service-wise basis. This is made possible by creating view-configuration information based on network-configuration information with respect to each of the services such that the view-configuration information is related to the network-configuration information. Because of such a configuration, it is possible to detect condition changes simultaneously in a plurality of views when the network-configuration-information has changes in the conditions thereof. This configuration eliminates inconsistency between different views.

The same objects can be achieved by the following system according to the present invention. Namely, a system for controlling a network including network elements and links includes a database which stores network-configuration information and view-configuration information such that the view-configuration information is related to the network-configuration information, a service-management server which attends to registering and updating of the information stored in the database, and defines views of a physical network configuration and a logical network configuration with respect to each of the services based on the view-configuration information stored in the database, a network-management server which collects information on configurations of the network elements and the links as well as information on failures, and informs the service-management server of a change in at least one of the configurations and the failures for a purpose of the updating, and a client which displays both or either one of the physical network configuration and the logical network configuration with respect to the client's own service based on the views defined by the service-management server.

Other objects and further features of the present invention will be apparent from the following detailed description when read in conjunction with the accompanying drawings.

FIG. 6 is a table showing database items;

FIG. 7 is a table showing database items relating to reconstruction;

FIGS. 10A and 10B are tables showing contents and descriptions of the contents with respect to database items shown in FIGS. 8 and 9;

FIG. 13 is an illustrative drawing showing multiple views;

FIGS. 15A and 15B are illustrative drawings for explaining failure-level information;

FIG. 16 is an illustrative drawing for explaining failure labels, physical-failure levels, and service-failure levels;

DESCRIPTION OF THE PREFERRED EMBODIMENTS

In the following, embodiments of the present invention will be described with reference to the accompanying drawings.

Figure 1:
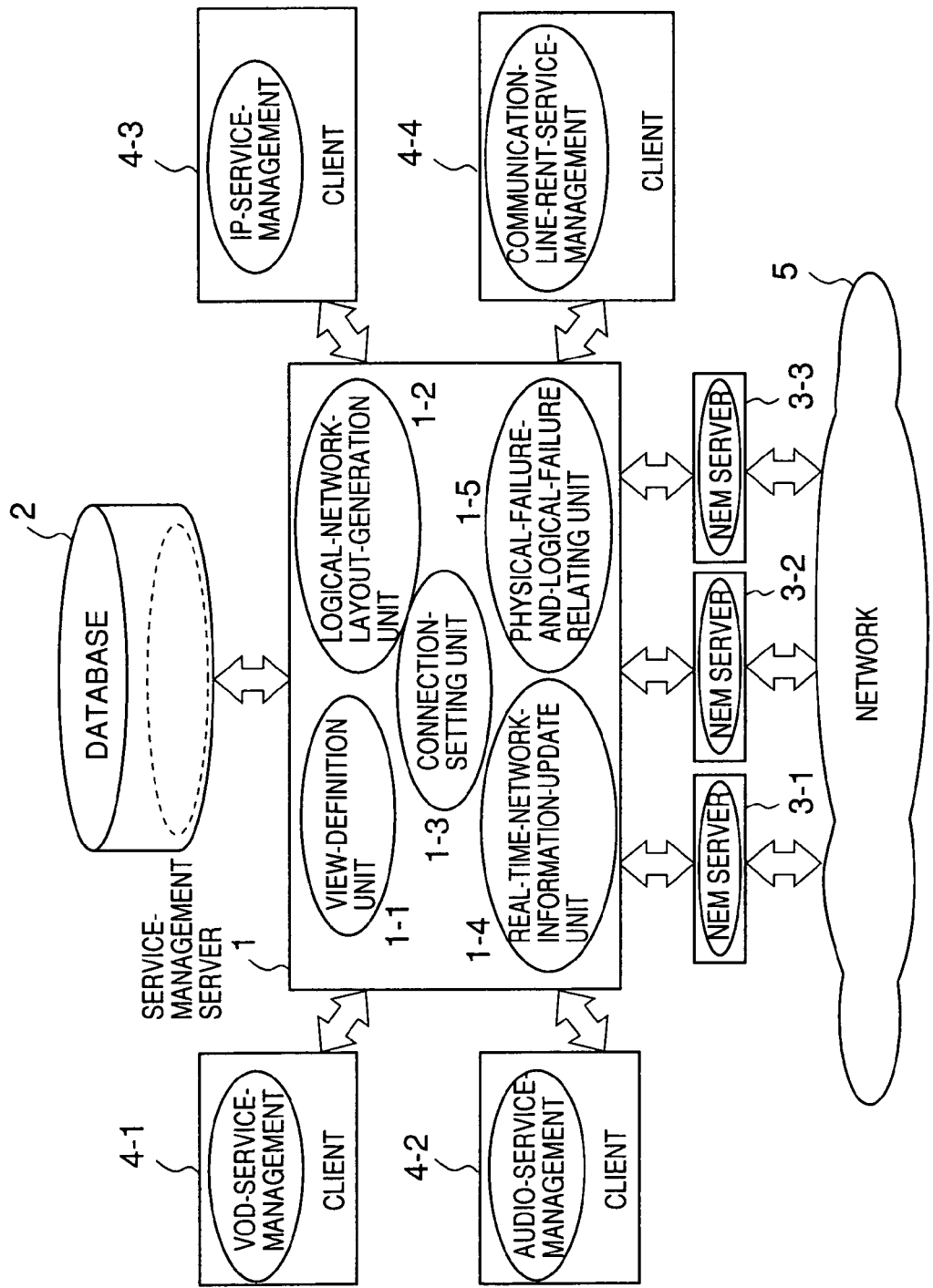
FIG. 1 is an illustrative drawing showing a schematic configuration of a network-management system according to the present invention.

FIG. 1 is an illustrative drawing showing a schematic configuration of a network-management system according to the present invention.

The network-management system of FIG. 1 includes a service-management server 1, a database 2, NEM (network-management) servers 3-1 through 3-4, a VOD (video-on-demand)-service-management client 4-1, an audio-service-management client 4-2, an IP (information provider)-service-management client 4-3, a communication-line-rent-service-management client 4—4, and a network 5.

The service-management server 1 includes a view-definition unit 1-1, a logical-network-layout-generation unit 1-2, a connection-setting unit 1-3, a real-time-network-information-update unit 1-4, and a physical-failure-and-logical-failure relating unit 1-5.

The NEM servers 3-1 through 3-4 collect information about updates of configurations of network elements, links, and the like as well as information about failures by tracking or polling operations, and informs the service-management server 1 of events that affect network operations. In response, the service-management server 1 updates the database 2. Network configuration information about the network 5 regarding ATM switches, high-speed communication lines, and the like is collected and stored in the database 2 at the time of a system startup, and is updated as changes are made to the network configuration. Further, one or more views are stored with respect to different service types by a view-creation procedure.

The clients 4-1 through 4-4 provide a VOD service, an audio service, an IP service, and a communication-line-rent service, respectively. These clients for providing the specific types of services described above are only an example, and other clients for other services can be added to the configuration of FIG. 1.

A view in the present invention refers to a unit of control on a GUI (graphical user interface) of the network-management system. Multiple views refer to views that are presented as if they were provided on separate networks corresponding to different services despite the fact that these services are in reality provided via a single network. A view can be presented in such a fashion as to show both or either one of a logical network configuration and a physical network configuration by finding matches therebetween.

A network administrator or a service administrator selects one or more views from a presented list of views, so that both or either one of the logical network configuration and the physical network configuration are shown on a display screen (not shown) with respect to the one or more selected views. On the presented views, a location of failure and an area that is affected by the failure are shown, and, further, settings of connections can be made. Further, a view that shows all the elements of the network with reference to no hierarchical structure is referred to as a flat view. A view that groups elements according to a region and shows these elements in a framework of a hierarchical structure is referred to as a domain view.

Figure 2:
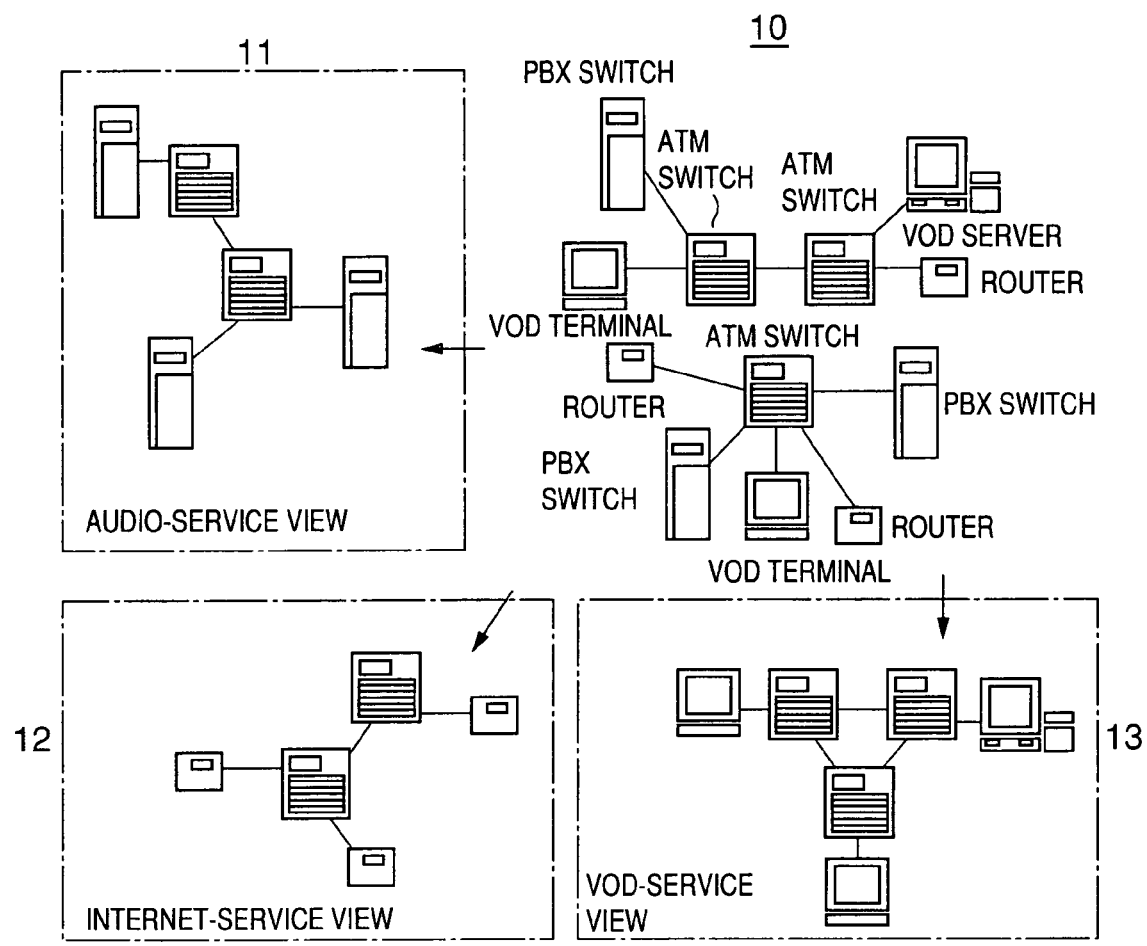
FIG. 2 is an illustrative drawing for explaining multiple views of the present invention with reference to a physical network configuration.

FIG. 2 is an illustrative drawing for explaining multiple views of the present invention with reference to a physical network configuration.

In FIG. 2, a physical network 10 shows a physical configuration of a network. An audio-service view 11, an Internet-service view 12, and a VOD-service view 13 show a physical configuration of a network for providing a corresponding service.

An audio service is provided via a network which includes PBX switches connected via ATM switches, for example. An Internet service is provided via a network in which routers are connected via ATM switches. Further, a VOD service is rendered by using a network in which a VOD server and VOD terminals are connected via ATM switches. A VOD-service administrator, for example, controls the network for providing the VOD service by using the physical network configuration of the VOD-service view 13 or a logical network configuration that can be presented as appropriate.

Figure 3:
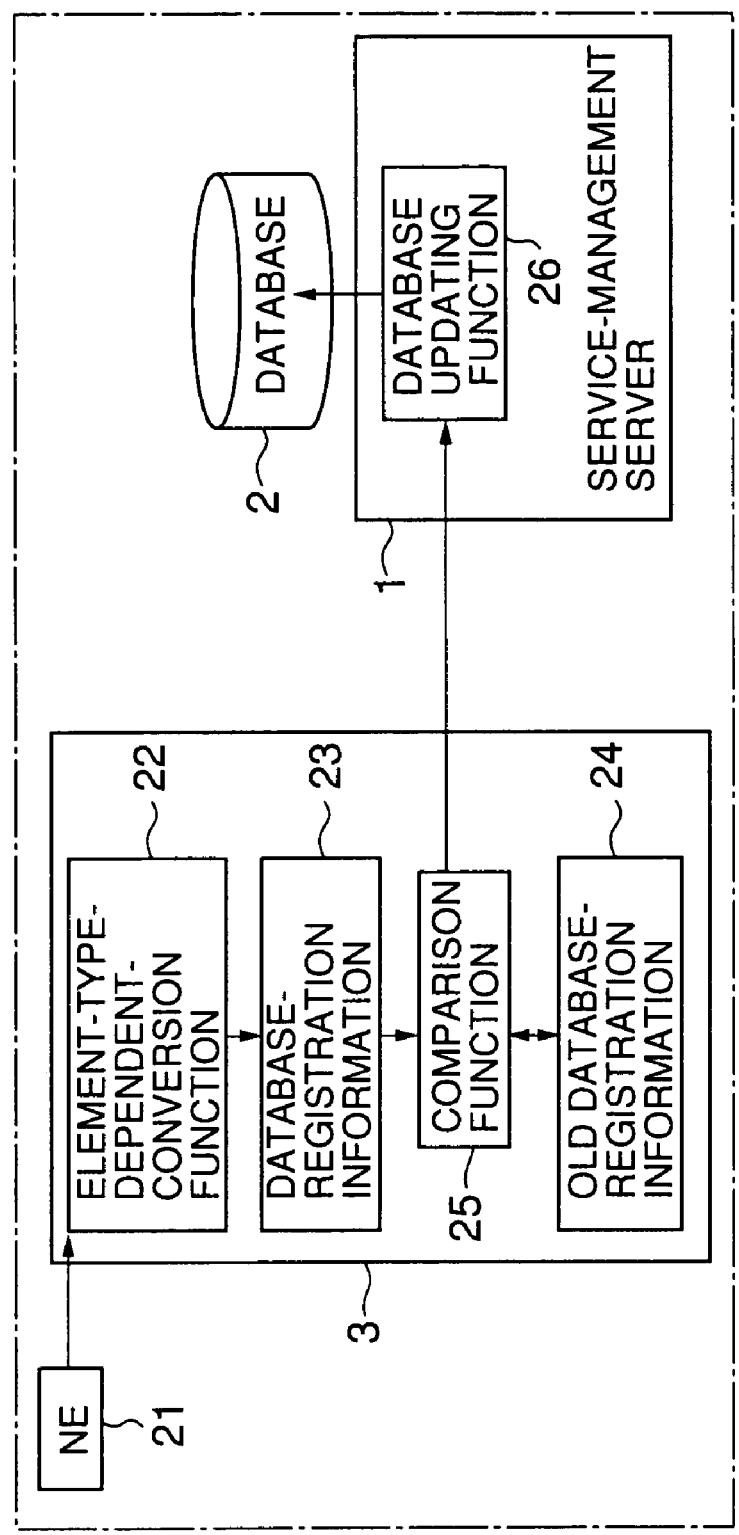
FIG. 3 is an illustrative drawing for explaining updating of a database according to the present invention.

FIG. 3 is an illustrative drawing for explaining updating of a database according to the present invention. FIG. 3 shows the database 2, the service-management server 1, a NEM server 3 that is one of the NEM servers 3-1 through 3-4, and a network element 21 that may be a switch or an ATM switch provided in the network 5 of FIG. 1. The NEM server 3 is generally located in a close proximity of the network. On the other hand, the service-management server 1 may be provided in a remote location and connected via another network (not shown) since the service-management server 1 is supposed to be connected to a plurality of NEM servers 3.

Information about all the network elements (21), which are subject to network management, is collected at the time of a system startup. When collecting update information about the network element 21 or information about a failure, the NEM server 3 uses an element-type-dependent-conversion function 22 to convert the collected information to database-registration information 23. Then, the NEM server 3 compares the database-registration information 23 with old database-registration information 24 by use of a comparison function 25, and replaces the old database-registration information 24 with the database-registration information 23 only if there is a change. Further, the NEM server 3 sends the database-registration information 23 to the service-management server 1. In response, the service-management server 1 uses a database updating function 26 to update the database 2. The database-registration information 23 is transferred only when service related information collected from the network exhibits a change. This achieves updating of the database 2 with a small amount of data transfer.

Figure 4:
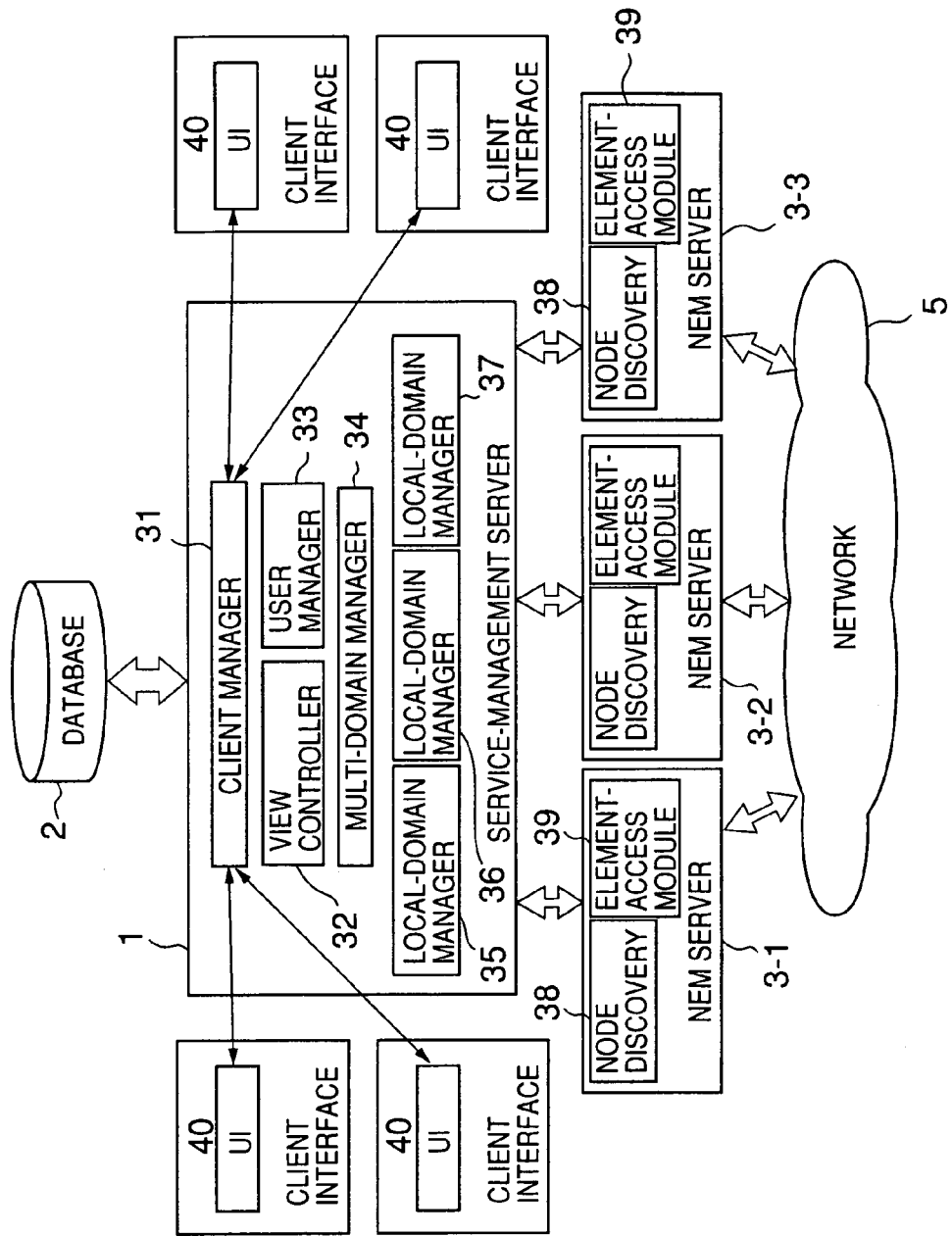
FIG. 4 is an illustrative drawing showing a component configuration corresponding to the system of FIG. 1.

FIG. 4 is an illustrative drawing showing a component configuration corresponding to the system of FIG. 1.

The service-management server 1 connected to the database 2 includes a client manager 31, a view controller 32, a user manager 33, a multi-domain manager 34, and local-domain managers 35 through 37. The local-domain managers 35 through 37 absorb differences in conditions that vary between different types of network elements such as ATM switches, SONET/SDH elements, LAN elements, etc. Each of the NEM servers 3-1 through 3-4 includes a node discovery 38 and an element-access module 39. Further, a client interface 40 provides GUI based on information obtained from the service-management server 1.

Figure 5:
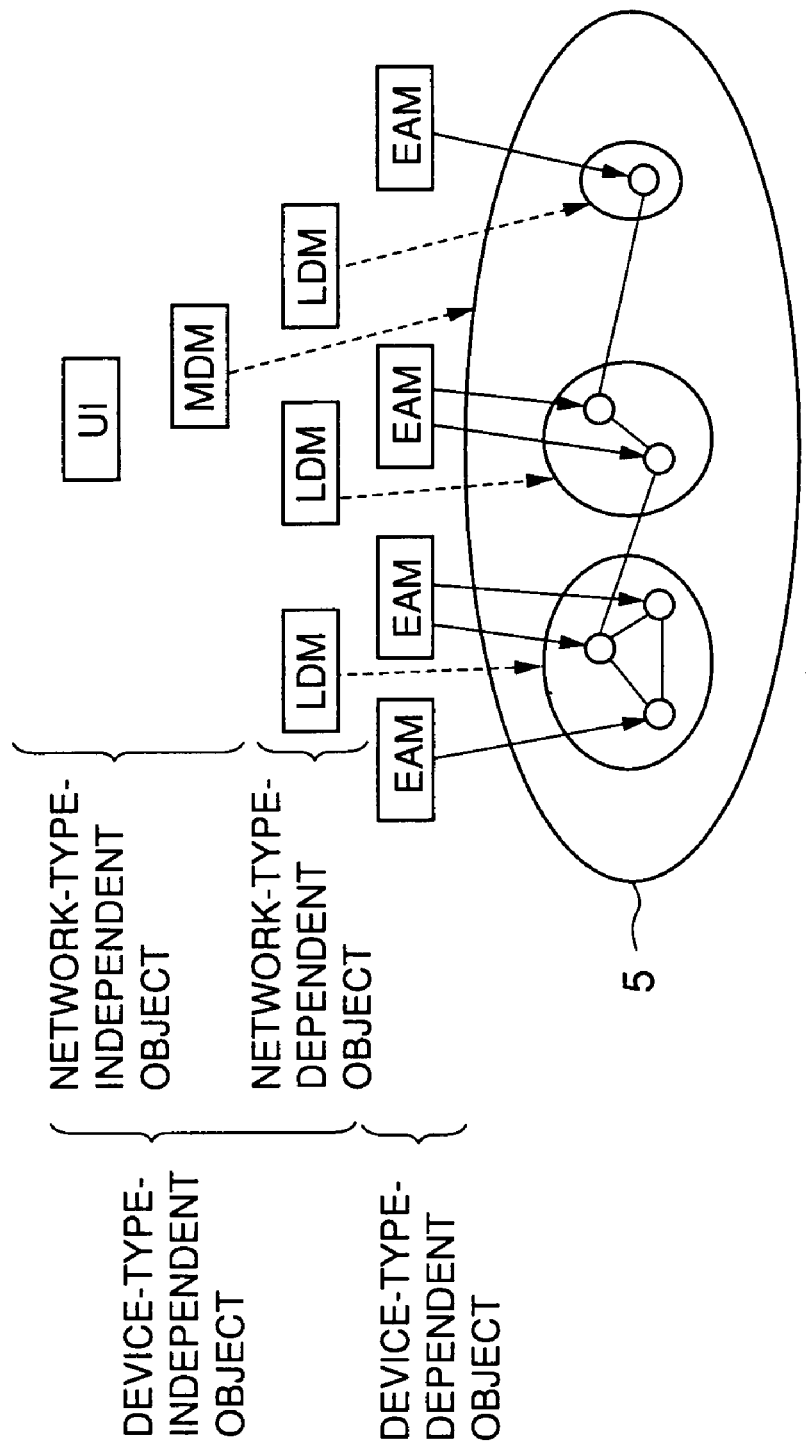
FIG. 5 is an illustrative drawing showing a system configuration based on components.

FIG. 5 is an illustrative drawing showing a system configuration based on components.

In FIG. 5, components of FIG. 4 are shown in a hierarchical structure, which separates element-type-dependent objects and element-type-independent objects. Further, the element-type-dependent objects are classified into network-type-dependent objects and network-type-independent objects. As shown in FIG. 5, the element-access module 39 is attached to each network element such as an ATM switch in the network 5, and absorbs element-type-dependent differences of conditions. Each of the local-domain managers 35 through 37 is provided for a network of a different type, and absorbs differences in conditions that differ depending on a network type such as ATM, SONET, SDH, IP, etc.

The multi-domain manager 34 attends to overall control of the network 5. The client interface 40 provides the GUI based on the information obtained from the service-management server 1. The user manager 33 of FIG. 4 is used for controlling relations between passwords and views where these passwords are required when a user (network administrator) accesses the GUI. The node discovery 38 performs a function to add or delete a network element as the network element newly becomes an object for management or becomes obsolete as an object for management. This achieves dividing of processes by network areas.

FIG. 6 is a table showing database items.

The database includes database items, information obtained from network elements, and conversion methods. FIG. 6 shows a network configuration, a node condition, a link condition, a connection route, and a connection condition as examples of database items relating to the service-management server 1. With regard to the connection route, for example, information is collected from cross-connect devices of a network, and a connection route is established by connecting the cross-connect devices together. When there is a change in the cross-connect devices, information about the route is modified partially. When there is no cross connection any longer, the connection route is deleted from the database.

FIG. 7 is a table showing database items relating to reconstruction.

The database includes, as events, a node failure, a node failure recovery, a connection creation, a connection modification, a connection deletion, and a user request. These events are provided as entries together with expected modifications and items to be collected. The user request is made by a user (i.e., a network administrator or a service administrator). With regard to the event of the connection creation, for example, addition of a new connection is expected as a modification, and a route of the added connection is an item to be collected.

Figure 8:
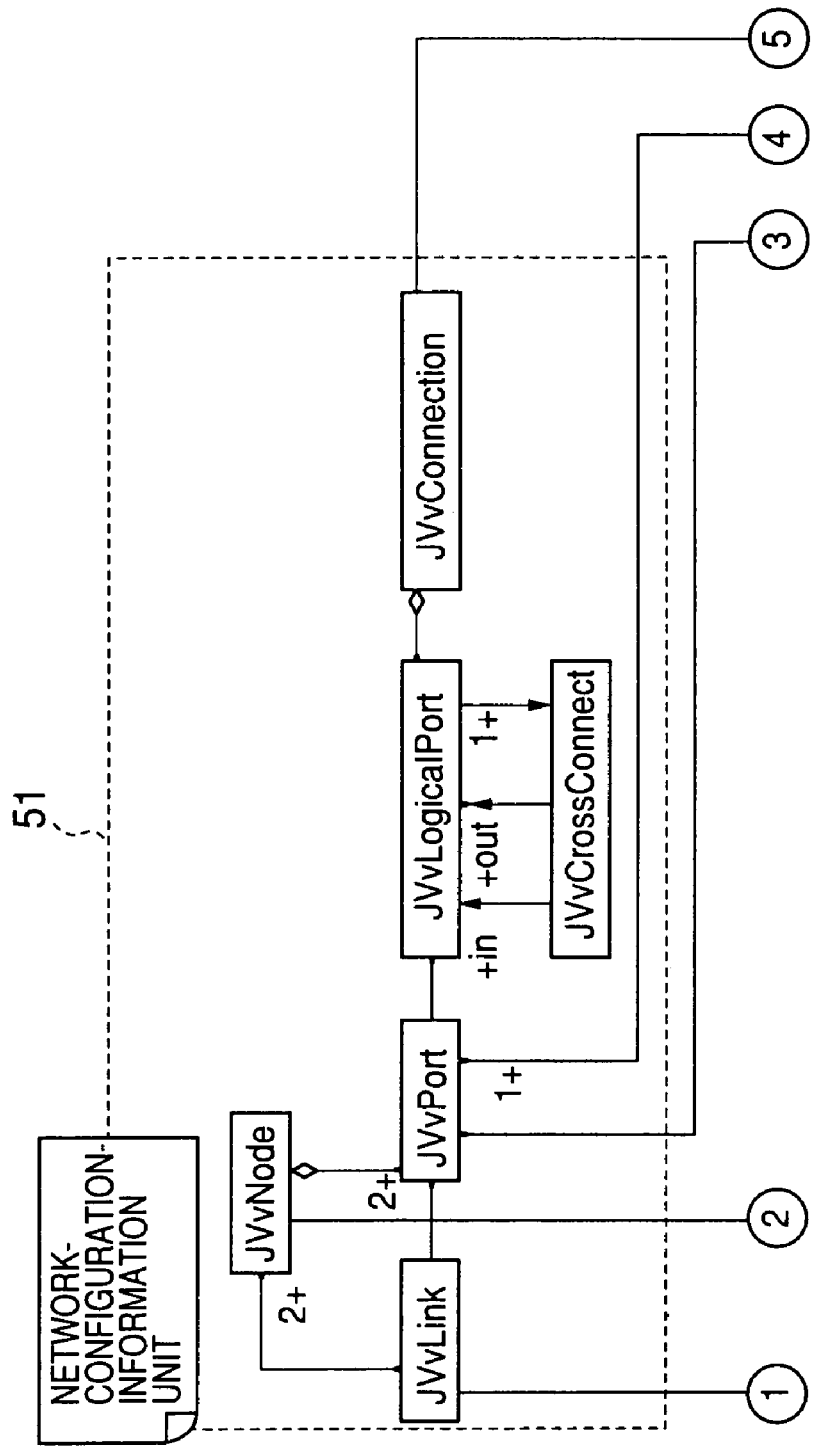
FIGS. 8 and 9 are illustrative drawings showing a configuration of the database.
Figure 9:
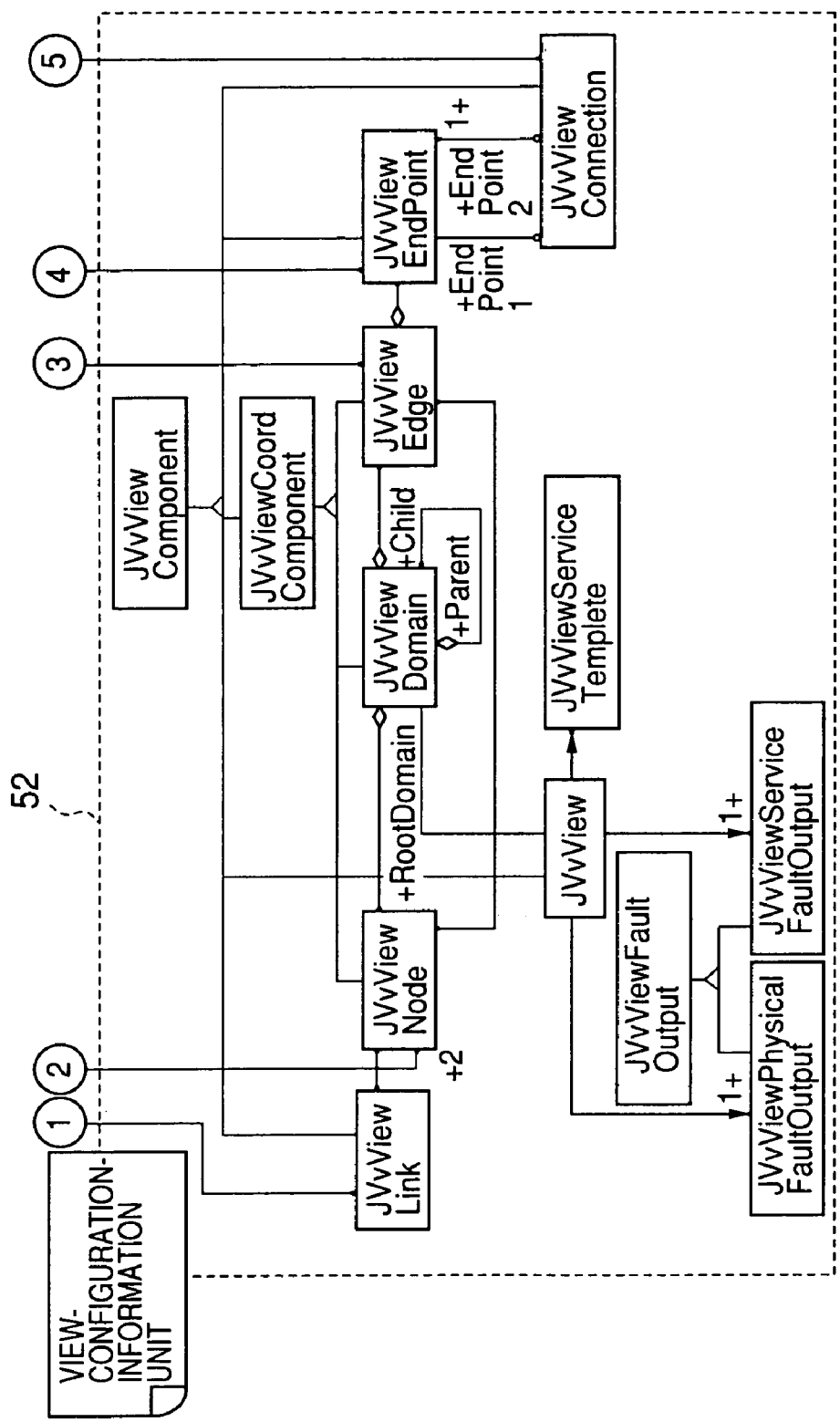

FIGS. 8 and 9 are illustrative drawings showing a configuration of the database.

The database is divided into a network-configuration-information unit 51 and a view-configuration-information unit 52. Connections between these two units are shown in FIGS. 8 and 9 by numerals (1) through (5).

FIGS. 10A and 10B are tables showing the contents and descriptions of the contents with respect to database items shown in FIGS. 8 and 9.

FIG. 10A shows database items relating to network-configuration information. JVvNode represents nodes, for example, and stores therein information about network elements. By the same token, JVvLink represents links, and stored therein information about communication lines between the network elements. FIG. 10B shows database items relating to view-configuration information. JVvView represents views, for example, and stores therein information used for management of a plurality of views. JVvviewDomain represents domains, and indicates a unit of control into which a view is divided.

Ports and connections are linked as network-configuration-information items so as to make it possible to detect a connection failure at the time of a port failure. Further, three network-configuration-inforamtion items, i.e., the node JVvNode, the link JVvLink, and the connection JVvConnection, are registered in the view configuration as a view node JVvViewNode, a view link JvViewLink, and a view connection JVviewConnection. This makes these items an object for management. In this manner, a view XXX as a view-configuration-information item is linked to a networkconfiguration-information item XXX, so that it is possible to detect a condition change simultaneously in a plurality of views when the network-configuration-information item XXX has a change in the condition thereof. This configuration eliminates inconsistency between different views.

Figure 11A:
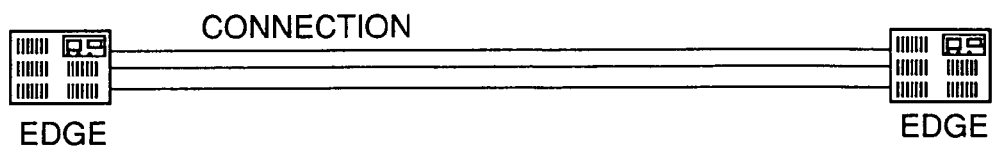
FIGS. 11A through 11C are illustrative drawings for explaining logical network configurations.
Figure 11B:
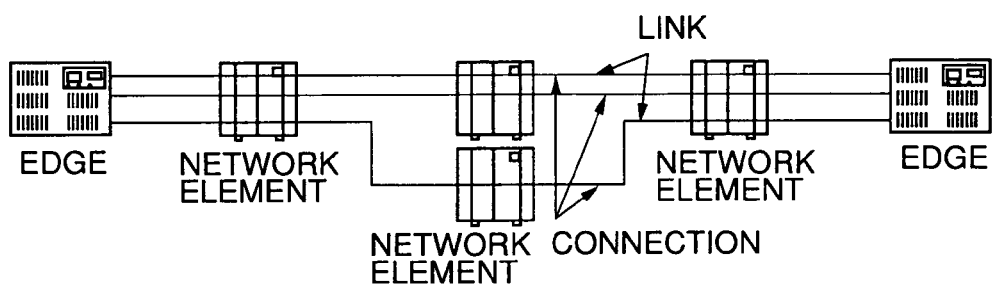
Figure 11C:
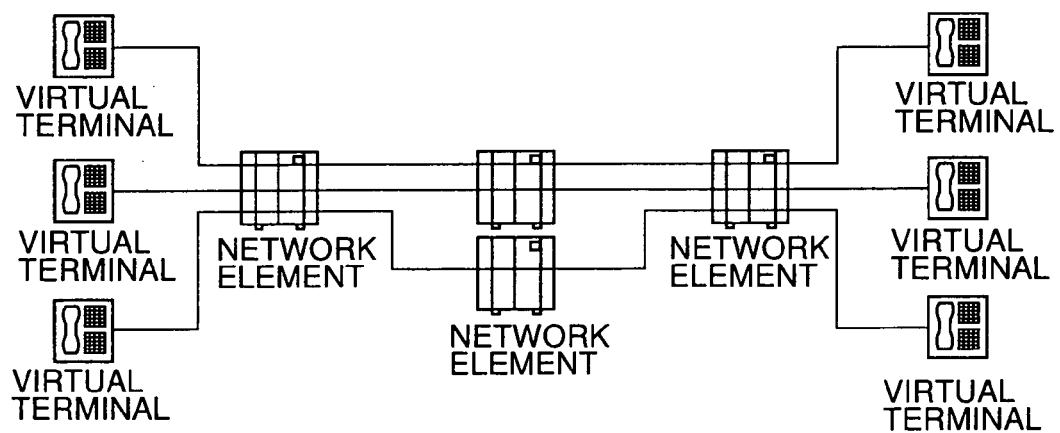

FIGS. 11A through 11C are illustrative drawings for explaining logical network configurations. FIGS. 11A and 11B show a case in which network elements connected to ports of a node being managed are defined as edges, and FIG. 11C shows a case in which a virtual terminal is connected at either end of a connection.

In FIG. 11A, a plurality of connections (logical network) are established between a pair of edges, and intervening network elements are hidden from the view, thereby showing only the connections between the edges. In FIG. 11B, edges are defined, and a network configuration including nodes and links is presented by showing network elements such as switches that have connections passing therethrough. In FIG. 11C, a network configuration is shown as having a virtual terminal connected to either end of a connection. Although FIG. 11C shows network elements along with the connections, these intervening network elements such as switches may be hidden from the view.

FIGS. 12A through 12D are illustrative drawings for explaining a trace display.

Figure 12A:
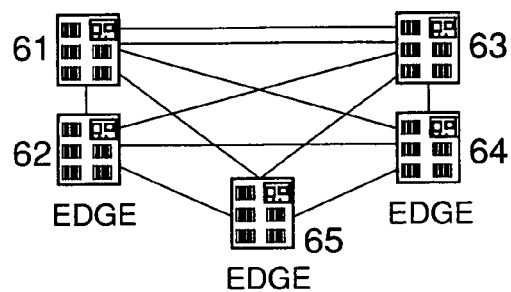
FIGS. 12A through 12D are illustrative drawings for explaining a trace display.
Figure 12B:
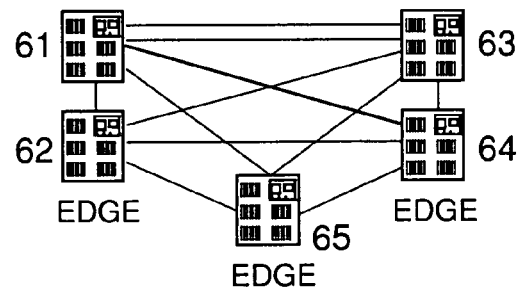
Figure 12C:
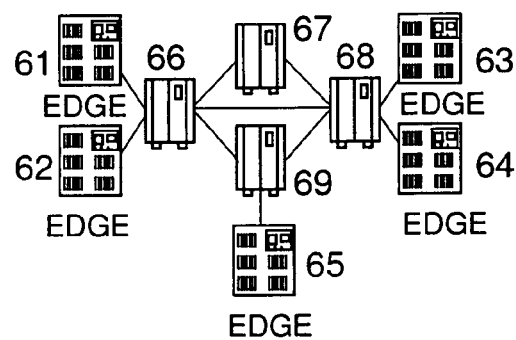
Figure 12D:
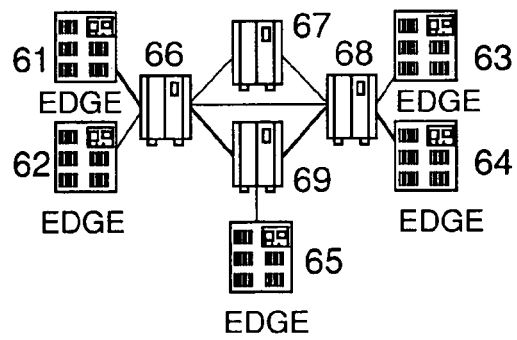

FIG. 12A shows a logical network configuration comprised of edges 61 through 65 and connections therebetween, and corresponds to the case of FIG. 11A. By selecting the edges 61 and 64, for example, the corresponding connection is displayed as a thick line as shown in FIG. 12B. FIG. 12C shows a physical network configuration comprised of edges and network elements, and corresponds to the case of FIG. 11C. The edges 61 through 65 are connected via network elements 66 through 69. A point in the network is selected, and a connection is traced from the selected point until the trace reaches an edge. The traced connection is then displayed. As shown in FIG. 12D, for example, a trace from the edge 61, the network element 66, the network element 69, the network element 68, to the edge 64 is displayed by using thick lines. In this example, distinctions are made by use of thick lines and thin lines, but may be made by using different colors.

FIG. 13 is an illustrative drawing showing multiple views. FIG. 13 shows a case in which a VOD service is provided. In a system of FIG. 13, a VOD server 71 and a VOD client 72 are connected via ATM switches 73 and transit devices 74. A network-control terminal 75 displays a network configuration based on control information 78 that is provided specifically for a network administrator or a service administrator of this terminal. By the same token, network-control terminals 76 and 77 display respective network configurations based on control information 79 that is provided specifically for network administrators or service administrators of these terminals.

As shown in FIG. 11A, the network-control terminal 76 displays connections between the edges (i.e., between the OVD server 71 and the VOD client 72). The network-control terminal 77, as shown in FIG. 11B, presents physical network configuration including the edges and the network elements. When a failure is indicated in the logical network configuration displayed on the network-control terminal 76, for example, the physical network configuration shown on the network-control terminal 77 is used so as to inform the network administrator of a location of the failure in the network. The network administrator can then attend to recovery.

Network elements and/or network types can be added by modifying the network-configuration information and the view-configuration information, and API (application programming interface) that provides information necessary for a network administrator is defined. API is activated with respect to device-type-dependent objects or network-type-dependent objects that are newly added, thereby making it possible to modify the database and the GUI display. Such modification includes creation/modification/deletion of nodes, links, and connections, modification of connection routes, recovery of node failures and port failures, creation/modification/deletion of view nodes, view links, view connections, domains, edges, views, service templates, separate-failure definitions, and service-failure definitions, etc.

Multi-vendor network elements include a device having only a single slot to insert a card and a device which can accept two cards. Not only such differences in device structures but also differences in parameter settings attribute to differences between network elements (devices). Further, all the network elements in the network are often not in compliance with the same standards. For example, a new-version element and an old-version element may coexist with respect to different vendors.

In consideration of this, data for representing a port is controlled as a character string that can be recognized by element-access modules EAM each provided specifically for a particular device type (element type). The character string represents a port address. Further, the local-domain manager LDM and the multi-domain manager MDM recognize the character string of the port address as data that simply represents a single port, and are not aware of details of the character strings.

Representation of connections is also different depending on network types. In an ATM network, a connection corresponds to a virtual channel, and is represented by VPI/VCI values. Other types of networks, however, do not employ such representation. In consideration of this, data representing a connection is controlled as a character string that can be recognized by local-domain managers LDM and multi-domain managers MDM each provided specifically for a particular network type. This character strings represents a connection address.

A cause and details of a failure differs from network element to network element. Because of this, the network-service-control system generalizes a failure of each network element, and converts the failure into a failure level for the management purposes. Element-type-dependent objects control relations between failure labels and failure levels. Namely, an element-type-dependent object analyzes a failure code received from a network element, and converts the code into a failure label. Then, the failure label, which is device-dependent, is converted into a failure level.

Figure 14:
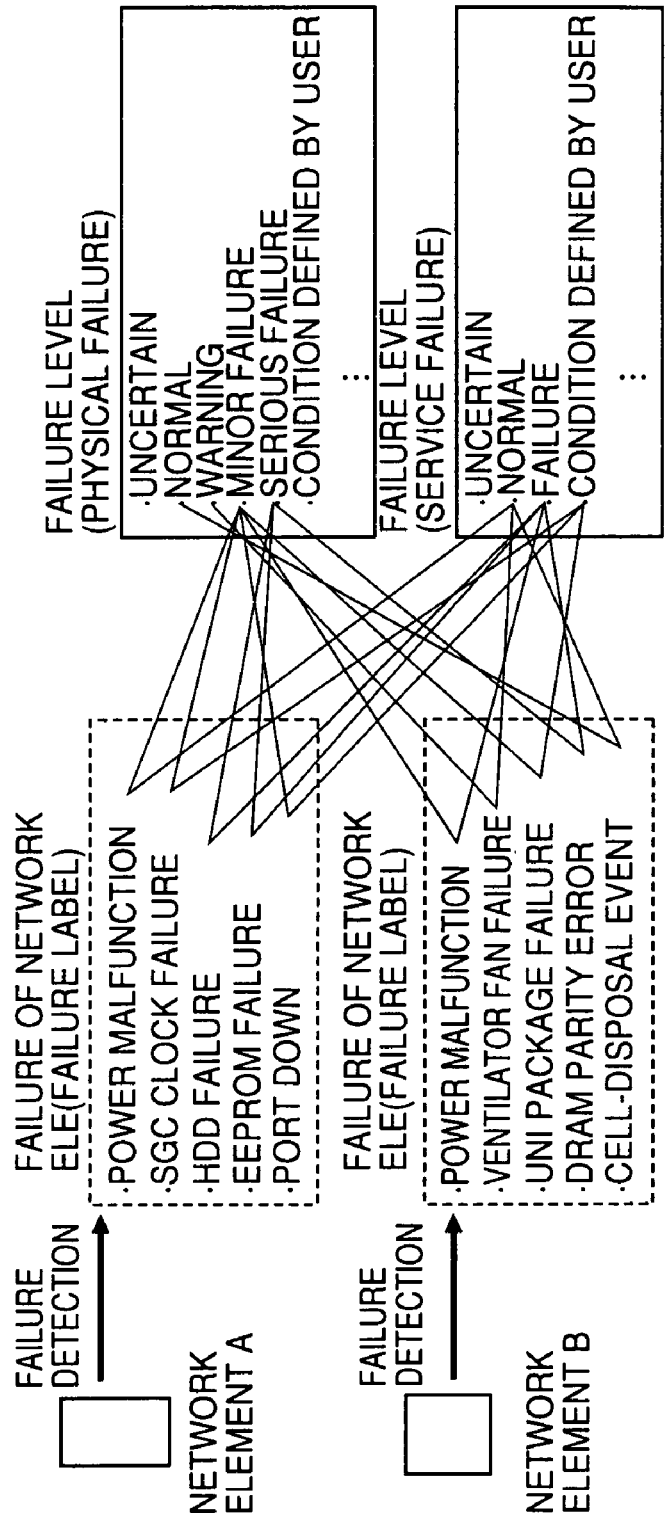
FIG. 14 is an illustrative drawing for explaining failure labels and failure levels.

FIG. 14 is an illustrative drawing for explaining failure labels and failure levels. FIG. 14 shows relations between failures (failure labels) and failure levels with respect to network elements A and B. Here, the failure levels are provided in two folds, i.e., in terms of physical failures as well as service failures. A failure of a hard-drive device of the network element A, for example, is regarded as a serious failure as a physical failure, and is regarded as a failure as a service failure since there is a possibility that the service has to be stopped. A failure of a ventilator fan of the network element B is treated as a warning in terms of the physical failure (to alarm a possible temperature hike), and is treated as a normal condition in terms of the service failure since the service can continue.

Further, a power malfunction of the network element B is a minor failure as a physical failure level, and is regarded as a normal condition as a service failure level.

FIGS. 15A and 15B are illustrative drawings for explaining failure-level information. FIG. 15A shows physical-failure-level information, and FIG. 15B illustrates service-failure-level information.

When a failure name (corresponding to the failure level of FIG. 14) is "warning", a failure level is "−1". Further, a color of icon is gray, and an alarm-sound ID is "0". When a failure name is "normal", a failure level is zero, and an icon color is green with an alarm-sound ID being "0". Further, a failure name "serious failure" corresponds to a failure level "3", an icon color "red", and an alarm-sound ID "3". When a failure name is "normal" in the list of service failures of FIG. 15B, a failure level is "0", and an icon color is green with an alarm-sound ID being "0". A failure name "failure" corresponds to a failure level "1", an icon color "red", and an alarm-sound ID "1".

FIG. 16 is an illustrative drawing for explaining failure labels, physical-failure levels, and service-failure levels. FIG. 16 shows an example of a network ATM switch.

When a failure label is "clock failure", for example, a physical-failure level is "3", and a service-failure level is "1". When a failure label is "UPS failure" (UPS: unstoppable power source), a physical-failure level is "3", and a service-failure level is "1". Further, a temperature failure corresponds to a physical-failure level "2" and a service-failure level "0". In this manner, relations between failure labels and failure levels are defined with respect to each network element, and are controlled by using a table format.

Figure 17:
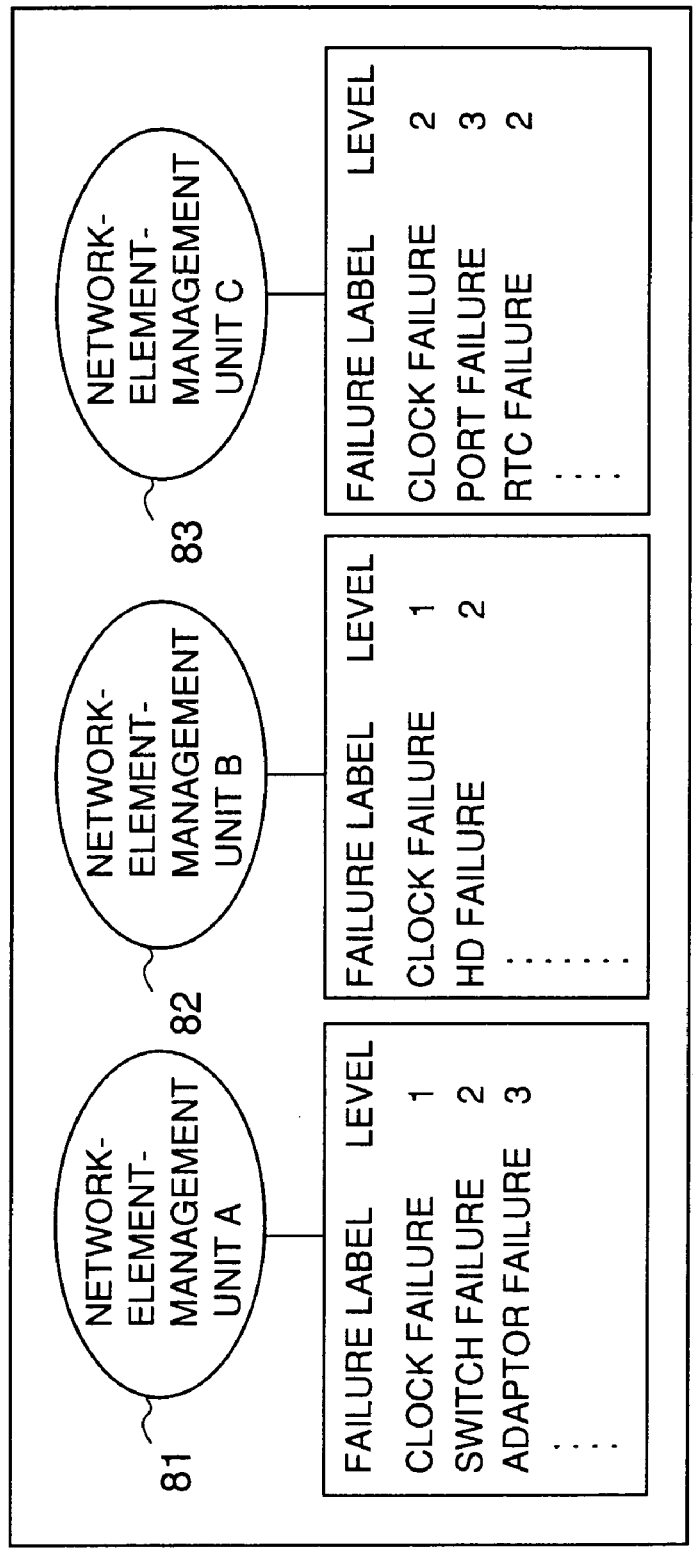
FIG. 17 is an illustrative drawing showing definitions of failure levels.

FIG. 17 is an illustrative drawing showing definitions of failure levels.

Network-element-management units 81 through 83 correspond to the element-access module 39 of FIG. 4, and have a function to absorb device-type-dependent differences. The network-element-management units 81 through 83 assign failure levels to failure labels that are defined with respect to network elements A, B and C. The failure levels are unique in the entire system. The failure levels indicate a degree of an effect that is taken on data flows running through connections. A failure level "0" indicates a normal condition, and a failure level "1" indicates a warning (no effect at present). Further, a failure level "2" represents a minor failure (some effect on part of services), and a failure level "3" corresponds to a serious failure (stoppage of service). In addition, a failure level "4" indicates a critical condition (service may be stopped for a long time).

The network-element-management unit 81 provided for the network element A assigns a failure level "1" to a clock failure, a failure level 2 to a switch failure, and a failure level 3 to an adaptor failure. In the network-element-management unit 82 provided for the network element B, a clock failure has a failure level "1", and a hard-drive failure has a failure level 2. This means that a hard-drive failure may affect part of services.

The network-element-management units 81 through 83 keep record of statuses of the network elements A through C by trapping or polling the network elements A through C. The network-element-management units 81 through 83 attend to control by distinguishing failures regarding the entire node from failures regarding a port that is part of the node. A failure of a port only affects a connection that uses this port. A failure of the entire node, on the other hand, affects all the connections relating to the node. It should be noted, however, that a failure of a port may affect other ports.

Figure 18:
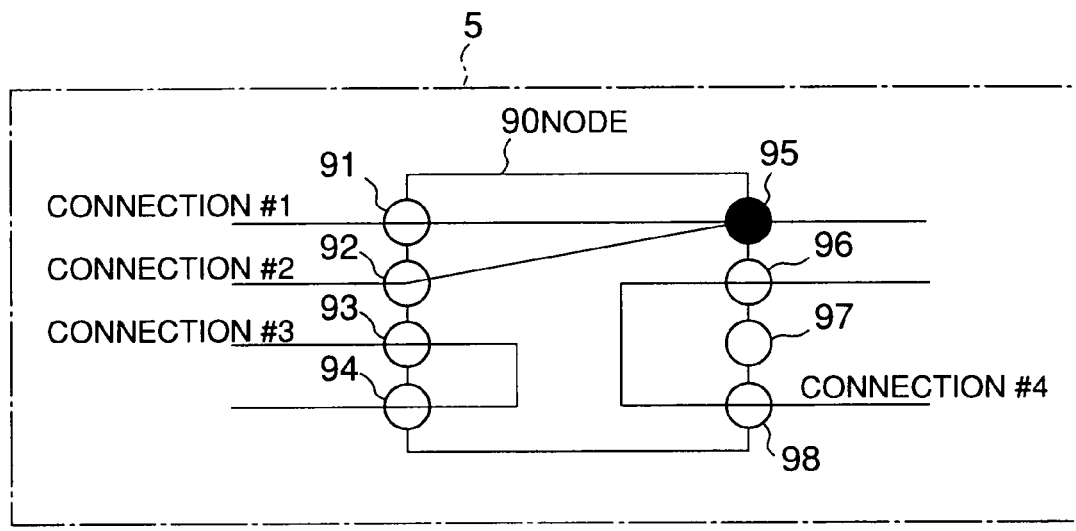
FIG. 18 is an illustrative drawing for explaining a spill-over effect of a port failure.

FIG. 18 is an illustrative drawing for explaining a spill-over effect of a port failure.

In FIG. 18, a node 90 of a network 5 includes ports 91 through 98. When a failure occurs at the port 95 which is shown by a solid circle, connections #1 and #2 are affected since the ports 91 and 92 are connected to the failed port 95.

The network-element-management units 81 through 83 collect information about failures of nodes and ports by a polling process or a trap process. When failures are observed at a node or a port, the highest failure level of all is retained as a failure level of this node or port. The highest failure level is compared with a prior failure level, and is reported as an event to other objects if the comparison indicates a change. In FIG. 17, for example, the network-element-management unit 81 retains the highest failure level "3", and the network-element-management unit 82 retains the highest failure level "2". By the same token, the network-element-management unit 83 maintains the highest failure level "3".

A failure level of each connection is detected by a failure-level-change event of a node or a port. If a plurality of nodes or ports suffer failures along a route of a given connection, the highest failure level of all is regarded as a failure level of the given connection. When a failure level of a connection changes, an event is issued.

Figure 19:
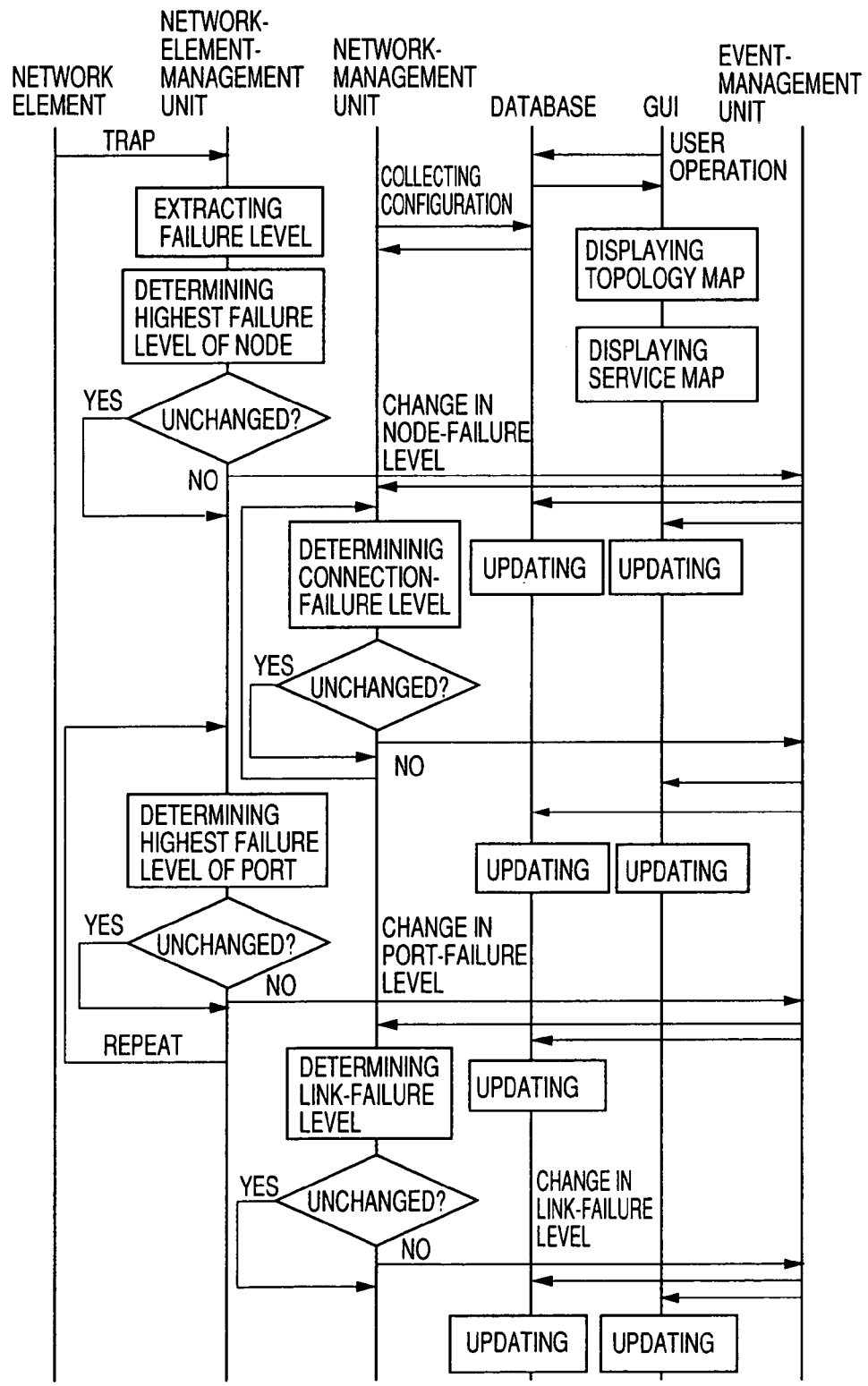
FIG. 19 is a flowchart of a process performed at the time of a failure-level change.

FIG. 19 is a flowchart of a process performed at the time of a failure-level change.

FIG. 19 shows schematic operations of a network element, a corresponding network-element-management unit, a network-management unit, a database, a GUI, and an event-management unit. The network-element-management unit serves to absorb differences in various failure information between network elements of different types. A request by a GUI user (network administrator or service administrator) initiates an operation of the database to collect network-configuration information. Based on the obtained network-configuration information, a topology map (physical network) and a service map (logical network) are displayed.

When obtaining the network-configuration information, the database requests the network-management unit to collect the network-configuration information, and the network-management unit transfers the collected network-configuration information to the database. Further, the network element informs the network-element-management unit of failure information through a trapping operation triggered by the failure or through a polling operation. The network-element-management unit obtains a failure level, and determines the highest failure level. The network-element-management unit further compares the highest failure level with the prior highest failure level, and informs the event-management unit of a change in a node-failure level if the comparison finds a change. If the comparison finds no change, the highest level is determined with respect to a port. Failure checks are supposed to be performed separately between a node and a port. Therefore, a failure check is made with respect to a port even if there is a change in the node.

In response to the notice of the change in a failure level, the event-management unit informs the GUI, the database, and the network-management unit of the change in a node-failure level. In response, the GUI updates the topology map, and the database updates the contents thereof. Also, the network-management unit checks a connection-failure level to determine if there is a change from a previous connection-failure level. If there is no change, a check of a link-failure level is made. If there is a change from the previous connection-failure level, the change in a connection-failure level is reported to the event-management unit. This procedure is repeated as many times as there are connections.

The network-element-management unit checks the highest failure level of the port, and determines if there is a change from the previous one. If there is no change, the procedure ends. If there is a change, the network-element-management unit notifies the event-management unit of the change in a port-failure level. This operation is repeated as many times as there are ports. The event-management unit, responding to the notice of the change in a port-failure level, forwards the notice to the network-management unit and the database. The database updates the contents thereof, and the network-management unit checks a link-failure level to see if the link-failure level is changed from the previous one. In there is no change, the procedure ends. If there is a change, a change in a link-failure level is reported to the event-management unit. The event-management unit then informs the database and the GUI of this change. The database updates the contents thereof, and the GUI updates the topology map. A check of a connection failure may be made from port failures.

Figure 20:
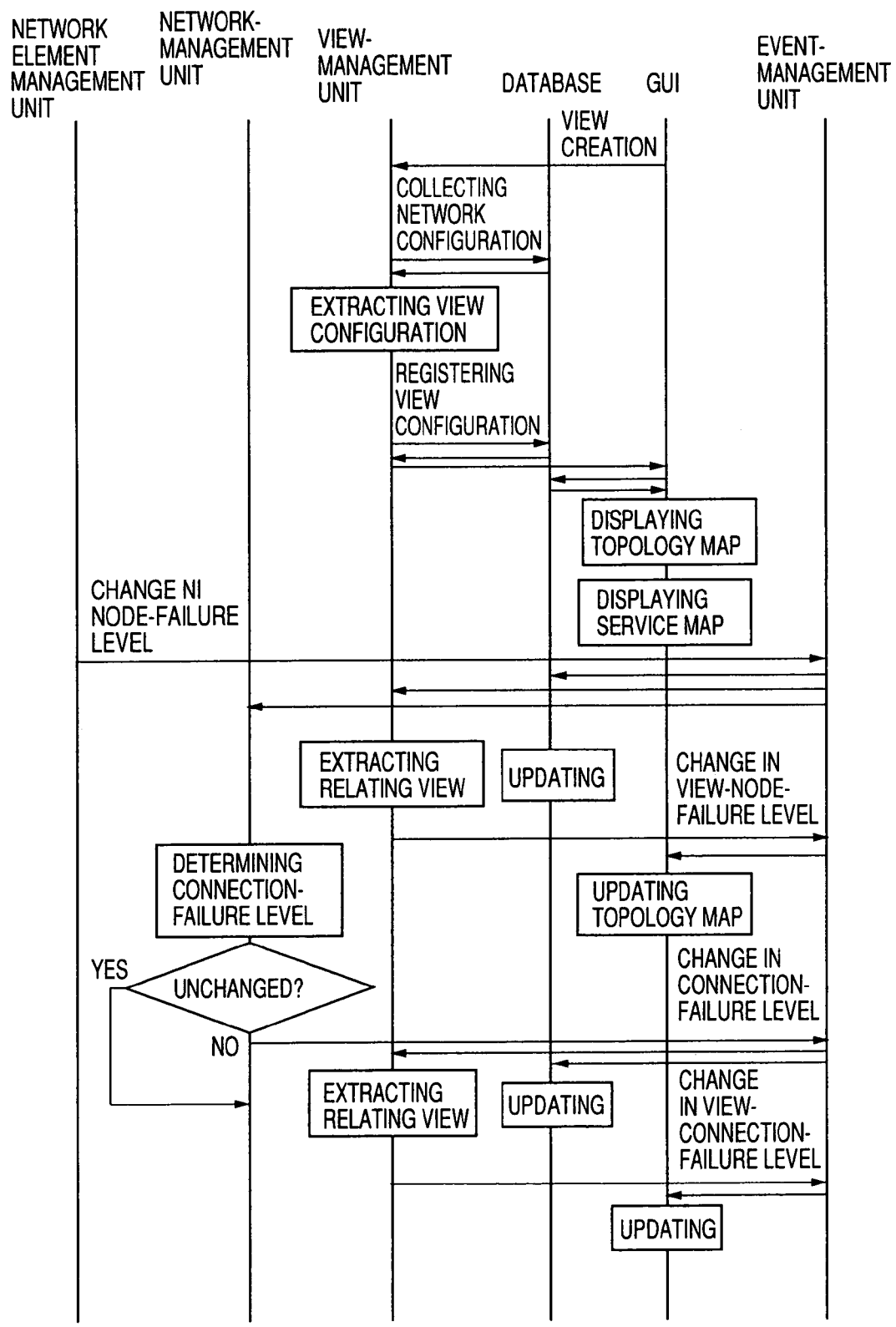
FIG. 20 is a flowchart of a process of creating multiple views.

FIG. 20 is a flowchart of a process of creating multiple views.

FIG. 20 shows schematic operations of a network-element-management unit, a network-management unit, a view-management unit, a database, a GUI, and an event-management unit. A network administrator or a service administrator using the GUI requests the view-management unit to create a view. In response, the view-management unit requests the database to collect network-configuration information. Based on the collected network-configuration information, view configurations are obtained in accordance with conditions specified in the view-creation request. The obtained view configurations are registered in the database.

The database informs the view-management unit of a completion of the view-configuration registration. In response, the view-management unit notifies the GUI of a completion of view creation. The GUI requests the view configuration registered in the database, and displays a topology map (physical network) and a service map (logical network) in accordance with the view configuration obtained from the database.

When the network element sends a node-failure-level-change notice to the event-management unit, the event-management unit notifies the network-management unit, the view-management unit, and the database of this fact. The network-management unit checks a connection-failure level, and decides whether there is a change from a previous level. If there is a change, the network-management unit informs the event-management unit of a connection-failure-level change.

The view-management unit obtains relevant views in response to the notice from the event-management unit, and reports a change in a view-node-failure level to the event-management unit. In response, the event-management unit requests the GUI to change the topology map, and the GUI attends to the updating process.

In response to the notice of the connection-failure-level change from the network-management unit, event-management unit informs the view-management unit and the database of this fact. The view-management unit then obtains relevant views, and reports a change in a view-connection-failure level to the event-management unit. Also, the database updates the contents thereof.

The event-management unit receives the notice of the change in a view-connection-failure level from the view-management unit, and reports this to the GUI. The GUI updates the service map accordingly. In the above procedure, if there is no change in the connection-failure level from the previous one, the procedure comes to an end.

One way to create views is to select all the network elements and communication lines that a user (network administrator or service administrator) desires to display, and such a selection is made on the GUI (i.e., on a network-configuration layout). Connections provided by the selected network elements and the communication lines are automatically extracted and registered as the views.

Another and second way to create views is to select all the connections that the user wishes to register as views, and such a selection is made on the GUI which shows a list of all the connections managed by the network-management system. All the network elements and communication lines that make up the selected connections are automatically extracted and registered as the views. A third way to create views is to select all the terminals (ports of network elements) that the user wishes to register, and such a selection is made on the GUI of the network-management system. All the connections that are connected to the selected terminals are automatically extracted and registered as the views. Connections, network elements, and communication lines that are added during operations are added to the views in real time.

A fourth way to create views is to select attribute conditions on the GUI of the network-management system with regard to connections the user desires to register as the view. The system automatically extracts all the connections that match the selected conditions as well as network elements and communication lines relating to the extracted connections, and registers these as the views. Connections, network elements, and communication lines that are added during operations are added to the views in real time. A fifth way to create views is to select, on the GUI of the network-management system, names of services that the user wishes to register as the views. As the same in the above, connections, network elements, and communication lines that are added during operations are added to the views in real time.

A sixth way to create views is that the user selects edges on both ends of routes running through the network so as to extract intervening paths and network elements between the selected edges. When there is a change during system operations, the contents of the views are updated based on the database.

The user who created the views as described above is provided with an authorization to update views and set/delete connections used in the views. Further, if a user creates the views for one or more services, the user can access the views, and, also, can select other users who can access the views.

In general, networks are comprised of network elements provided by more than one vendor. In such a network having a multi-vendor environment, settings of connections may not be made in the same fashion between different network elements because of differences in parameters to be used. In consideration of this, connection attributes are defined with respect to each of the provided service. This is done in such a manner as to comply with established standards such as those of the ITU-T.

Figure 21:
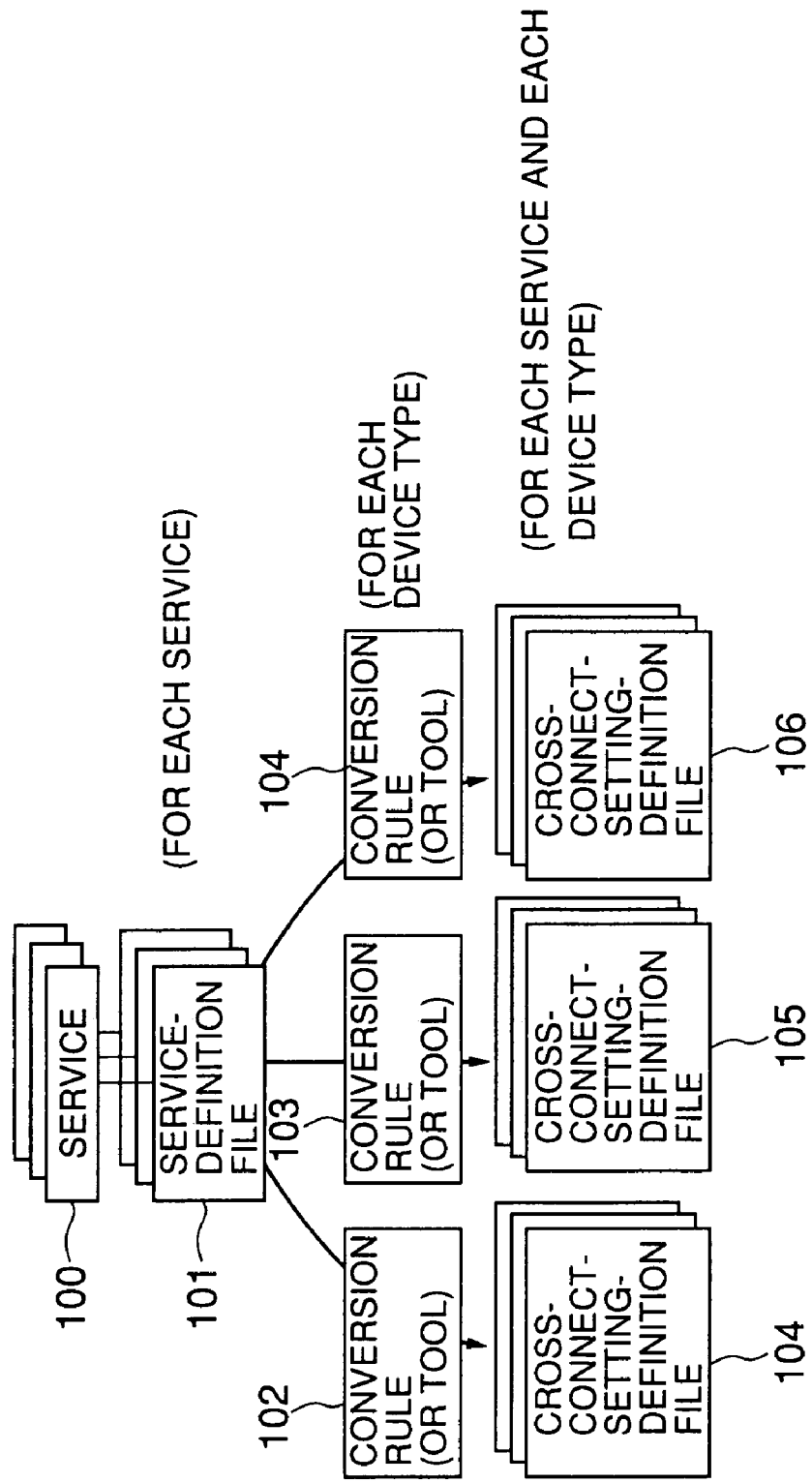
FIG. 21 is an illustrative drawing showing an example of definition files used in a multi-vendor environment.

FIG. 21 is an illustrative drawing showing an example of definition files used in a multi-vendor environment. FIG. 21 shows a case where definitions are provided for connection settings.

As shown in FIG. 21, a service-definition file 101 is created with respect to each service 100. The service-definition file 101 is so created as to comply with certain standards as described above. Further, cross-connect-setting-definition files 104 through 106 are provided to be service-type dependent or device-type dependent, and conversion rules 104 are generated on a device-type-wise basis so as to provide conversion rules between the service-definition file 101 and the cross-connect-setting-definition files 104 through 106.

The cross-connect-setting-definition files 104 through 106 are created on the device-type-wise basis or on the service-type-wise basis as described above. The contents of the cross-connect-setting-definition files 104 through 106 are as follows.

Figure 22:
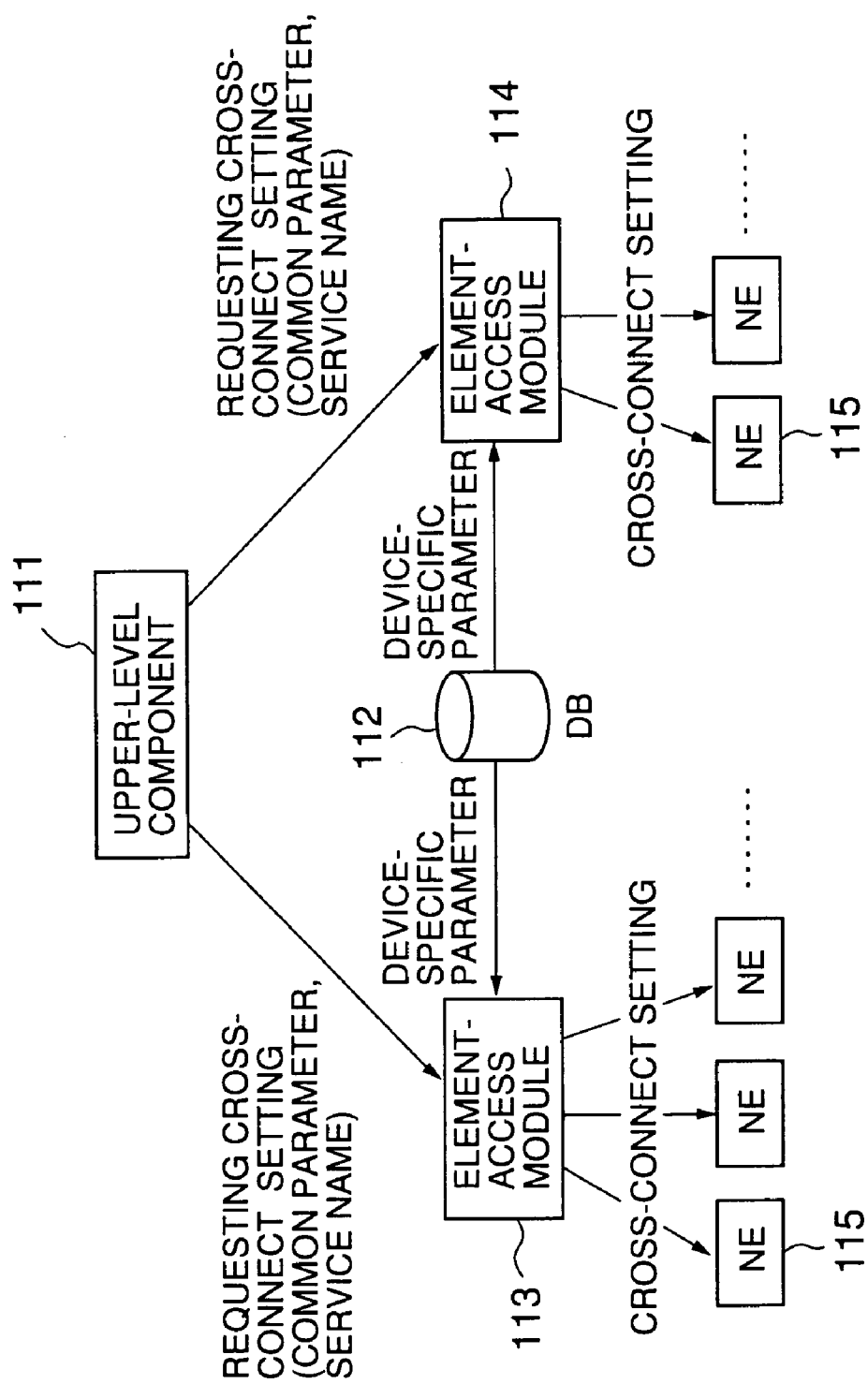
FIG. 22 is an illustrative drawing for explaining making of cross-connect settings.

A) Network Element 1
 ServiceName=VOICE;
 QoS=1;
 Assing=Peak;
 CR=100; and so on B) Network Element 2
 ServiceName=VOICE;
 ConnType=both;
 ServiceCategory=CBR;
 PriorityClass=high;
 PCR_CLP0=12;
 PCR_CLP0+1=12;
 OAM=ON; and so on FIG. 22 is an illustrative drawing for explaining making of cross-connect settings.

At the time of connection setting, element-access modules 113 and 114 are used for making cross-connect settings to network elements 115. Parameters necessary in this process include common parameters such as input-side connection addresses and output-side connections addresses as well as device-type-dependent (device-specific) parameters. The element-access modules 113 and 114 receive common parameters and service names from an upper-level component 111, and looks for device-specific parameters based on the service names. Here, the device-specific parameters are kept in a storage of a database 112. The element-access modules 113 and 114 thus can make cross-connect settings by using the common parameters and the device-specific parameters.

Figure 23:
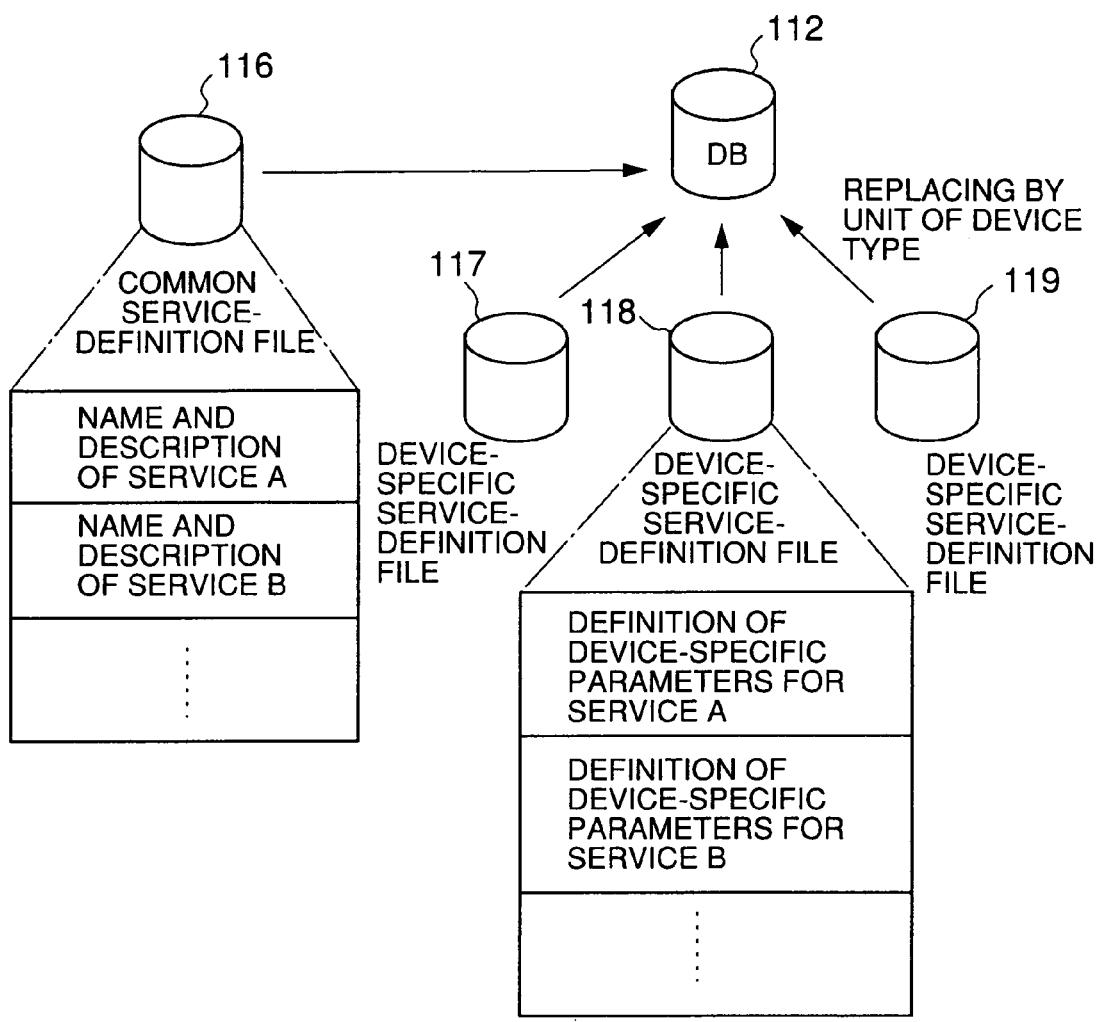
FIG. 23 is an illustrative drawing for explaining registration of device-specific parameters.

FIG. 23 is an illustrative drawing for explaining registration of device-specific parameters.

A set of service-definition files includes a common service-definition file 116 and device-specific service-definition files 117 through 119. Only one common service-definition file 116 is provided in the system, and is used for controlling service names and descriptions of the services. The device-specific service-definition files 117 through 119 are provided on the device-type-wise basis. When the device-specific service-definition files 117 through 119 are registered in the database 112, all the device-specific parameters are updated with respect to devices which are to be controlled by the service-definition files.

A format of the common service-definition file 116 may be as follows, for example.
 statement:=definition-statement|comment-statement
 definition-statement:='Service='name','description
 comment-statement:='#'comment|[blank line]
 name:=[character string]
 description:=[character string]
 comment:=[character string]

Definitions of service names and services may be as follows.
 Service=[name, description]
 Service=[name, description]
 •
 •
 •

For example, these definitions may be given as follows.
 Service=VOD, VOD service
 Service=Audio, Audio service A blank line or a line starting with "#" is regarded as a comment line. A format of the device-specific service-definition files 117 through 119 may be as follows.
 statement:=selection-statement|definition-statement|comment-statement
 selection-statement:='ServiceName='name
 definition-statement:=key'='value
 comment-statement:='#'comment|[blank line]
 name:=[character string]
 key:=[character string]
 value:=[character string]
 comment:=[character string]

Selection sentences, definition sentences, comment sentences, and so on are also defined. A definition of the selection sentence defines device-specific-parameter values, and the element-access modules define keys specifically with respect to respective device types.

Figure 24:
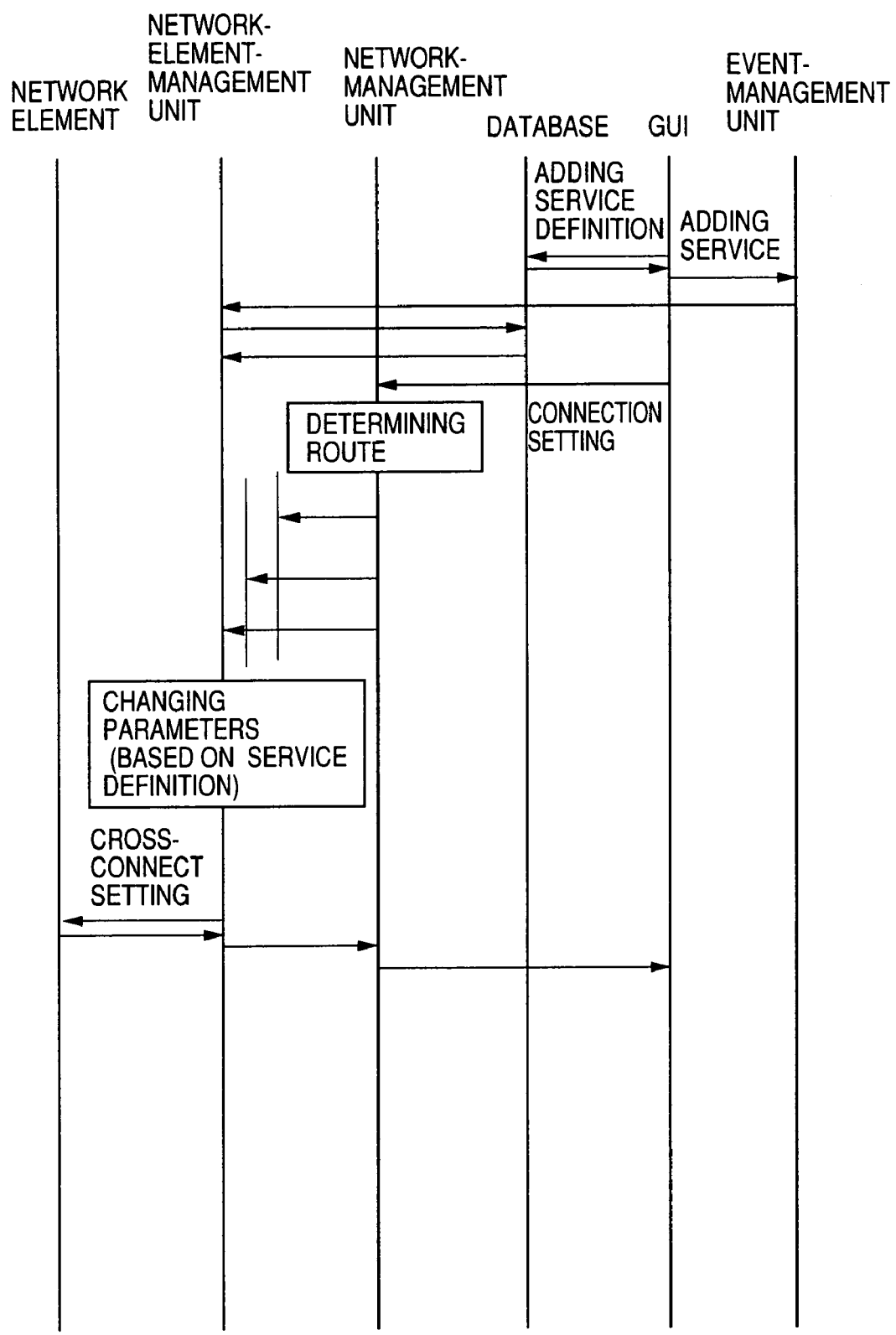
FIG. 24 is an illustrative drawing showing a procedure of cross-connect setting.

FIG. 24 is an illustrative drawing showing a procedure of cross-connect setting.

When a network administrator or a service administrator requests to add a service definition by using the GUI, the database returns a response to the GUI. Then, the GUI notifies the event-management unit of an addition of a service. The event-management unit sends a relevant request to the network-element-management unit. The network-element-management unit requests the database to obtain the service definition, and the database sends the requested service definition to the network-element-management unit.

Further, the GUI sends a connection-setting request to the network-management unit. The network-management unit determines a route in accordance with the connection-setting request, and sends a cross-connect-setting request to each of the network-element-management unit that relates to the determined route. In response to the cross-connect-setting request, the network-element-management unit changes parameters in accordance with the service definition, and makes cross-connect settings to a relevant network element (i.e., a cross-connect device). After receiving a notice of completion of setting from the network element, the network-element-management unit notifies the GUI of the completion of cross-connect setting via the network-management unit.

Figure 25:
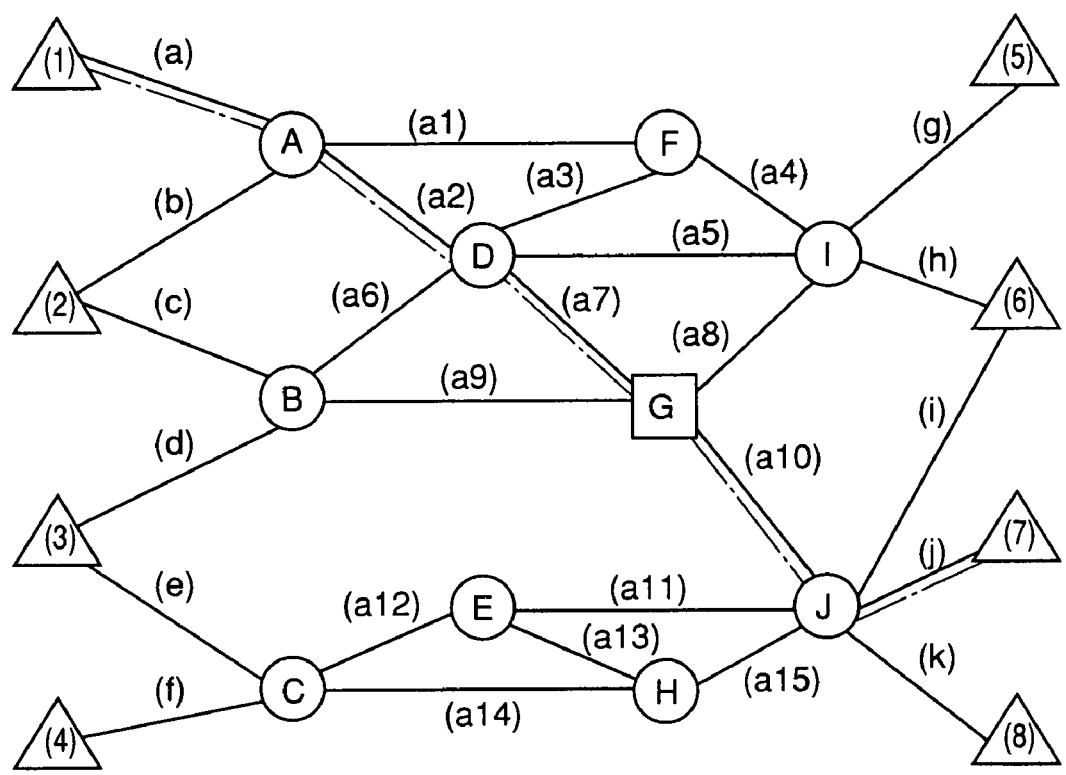
FIG. 25 is an illustrative drawing for explaining setting of a route.

FIG. 25 is an illustrative drawing for explaining setting of a route.

In FIG. 25, triangle symbols (1)–(8) represent edges, and letters A–J encircled or put in a square represent nodes. Further, letters (a)–(k) and (a1)–(a15) indicate links. Thin lines are used for a single link, and thick lines are used for a plurality of links. A physical network configuration is presented as a view as shown in FIG. 25. Then, a blue color may be used for representing a unselected status or a no-setting status, and a yellow color may be used for indicating a selected status of a route (but details are not yet set). Further, an orange color may mean a selected status of a route with details thereof being set, and a gray color may indicate that all the settings are made to a route.

Details of settings indicate which one of a plurality of links is selected if there is more than one link, and show a selected status if there is only one link. In the case of a node, details of settings determine all items of route-specific attributes. In the case of an edge, details of settings indicate a selected status at all times.

At an initial status, no setting is in place, so that every element is displayed in blue. When a route is to be established between the edges (1) and (7) of FIG. 25 in the case of point-to-point permanent virtual circuits (P—P PVC), the edge (1) is first selected. As a result, the edge (1) is displayed in orange. Thereafter, a node A connected to the edge (1) is selected, thereby adding the link (a) to the route. As a result, the link (a) as well as the edge (1) are shown in orange, and the node A is presented in yellow, indicating that the route is selected but details are not yet set.

After this, the node D along the route toward the edge (7) is selected to indicate the link (a2) between the node A and the node D. By doing this, an output-side port of the node A and an input-side port of the node D are automatically set based on the configuration information about the nodes A and D. The links (a1) is shown in orange, and the node D is displayed in yellow.

In the same manner, the nodes G and J are selected to elect the links (a7) and (a10), thereby determining the route between the edge (1) and the node J. Finally, the edge (7) is selected to complete the route, so that the links (1), (a2), (a7), (a10), and (j) as well as the node A, D, G, and J are shown in orange indicative of a status that details are set. After confirming what is displayed, a cross-connect request is issued. In response, cross-connect-setting information matching each node type is sent out from the database. With respect to the node G, for example, cross-connect-setting information for connecting the links (a7) and (a10) together is obtained. In this manner, the route as shown in dashed lines is established between the edge (1) and the edge (7), allowing communication therebetween.

In the case of the edge (7) being a VOD server, for example, a service administrator of the VOD service displays a view of the VOD service, and attends to connection settings by following the procedure as described above based on the displayed view. Alternatively, the edges (1) and (7), for example, are selected, and a route connecting between the selected edges (1) and (7) may be automatically selected in such a manner as to employ as small a number of nodes and links as possible based on the network-configuration information.

Further, canceling of a route selection is possible. For example, the selection of the route of the above example needs to be canceled by starting from the node G. When selections of the link (a7), the node G, the link (a10), the node J, and the edge (7) are nullified, information on the output-side port of the node D is reset, so that the node D falls into a status of no-detail setting. As a result, the node D is changed from an orange color to a yellow color. Starting from this condition, the nodes F, I, G, and J may be selected successively so as to establish a different route between the node (1) and the node (7).

Figure 26:
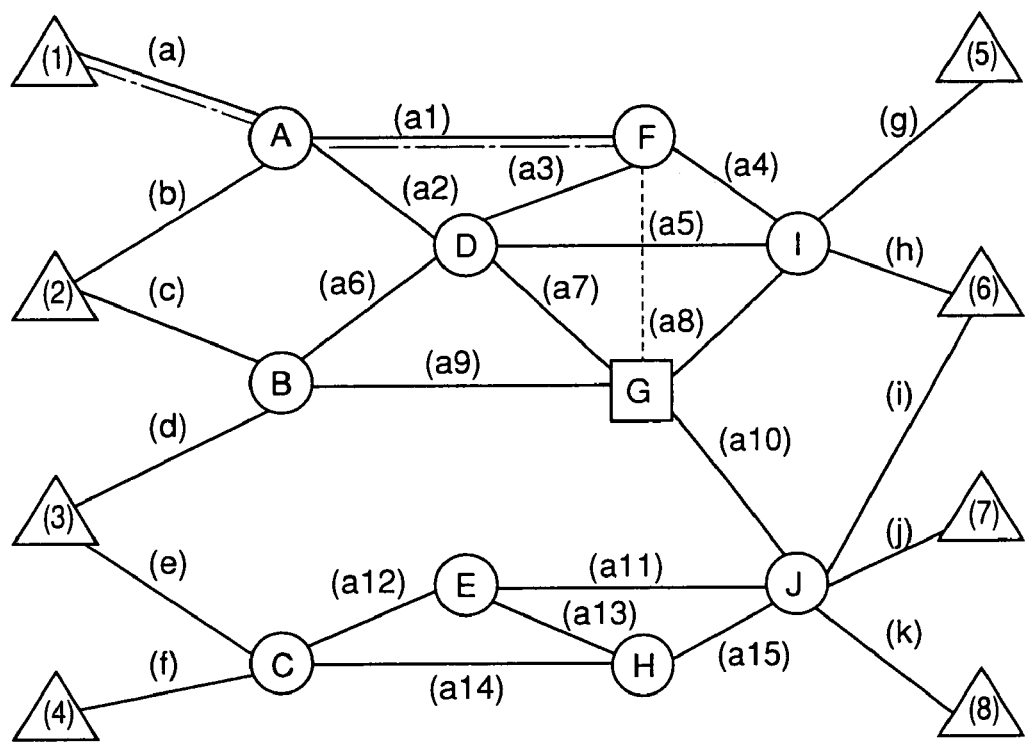
FIG. 26 is an illustrative drawing for explaining setting of a route that includes virtual links.

FIG. 26 is an illustrative drawing for explaining setting of a route that includes virtual links. FIG. 26 shows a case where P—P S-PVC is employed, and uses the same reference numerals and letters for the same elements as those of FIG. 25.

In FIG. 26, the edge (1), the link (a), the node A, and the link (a1) are already set with regard to details thereof, and the node F has a route-specific attribute thereof set to S-PVC Calling. When the node G is added to the route, a virtual link shown by a dotted line is displayed despite the fact that there is no physical link between the node F and the node G. This virtual link is presented in orange.

After this, the node J is selected to choose the link (a10) between the nodes G and J, and the edge (7) is selected to choose the link (j). As a result, a route is established between the edge (1) and the edge (7) via the link (1), the node A, the link (a1), the node F, the virtual link, the node G, the link (a10), the node J, and the link (j). IF the node I is selected rather than selecting the node G, the link between the nodes F and I is displayed by a dotted orange line indicative of a virtual link despite of the fact that there is a physical link (a4) between the nodes F and I.

When the route selection is canceled by using the node G as a base point, only a selection on the S-PVC Called side is reset. As a result, a route made up from the edge (1), the link (a), the node A, the link (a1), and the node F remains after the canceling of the selection. If the route selection is canceled by using the node F as a base point, the selection is reset on both the S-PVC Calling side and the S-PVC Called side.

Figure 27:
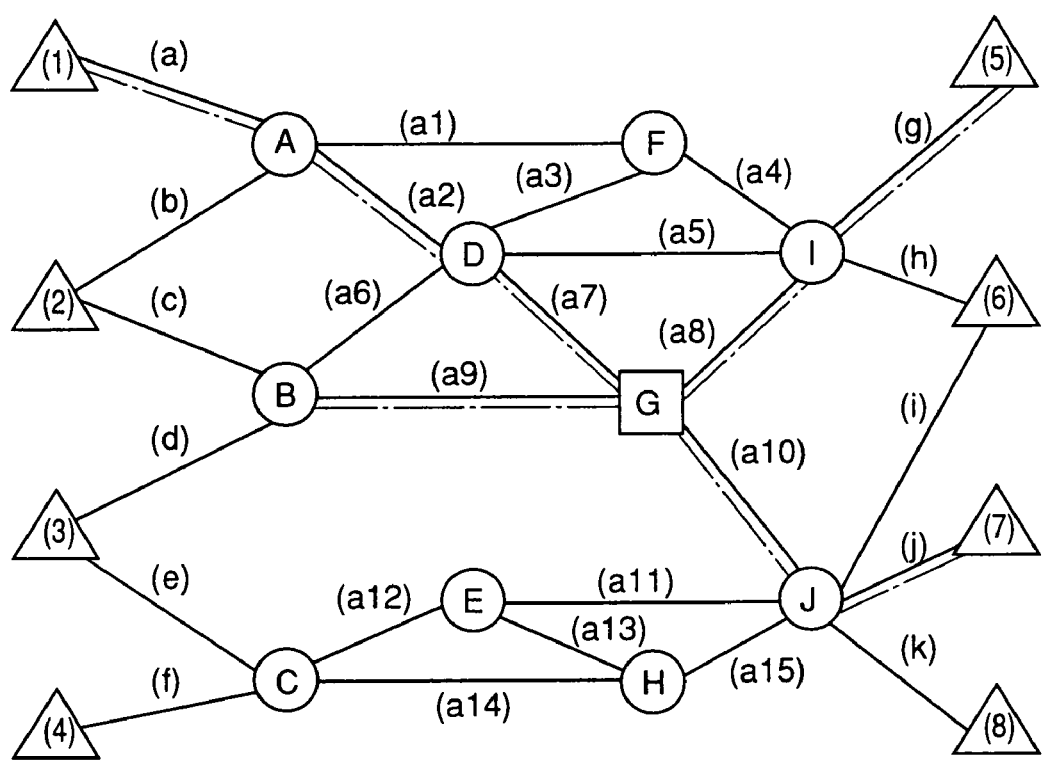
FIG. 27 is an illustrative drawing for explaining setting of a route which includes a node that can divide a route.

FIG. 27 is an illustrative drawing for explaining setting of a route which includes a node that can divide a route.

When the node G that can divide a route is included along the route indicated by dotted lines between the edge (1) and the edge (7), the node I can be selected by indicating the node G as a base point. When this selection is made, the link (a8) between the node G and the node I is automatically set. Then, the edge (5) and the link (g) are selected, for example, so that a route between the edge (1) and the edge (5) is established. Further, if the node B is selected by using the node G as a base point, the link (a9) is automatically set between the node G and the node B. In this manner, the route indicated by dotted lines is established between the edge (1) and the edge (7) along with the branch routes originating from the node G.

Canceling of the selection is performed in the same manner as described in the previous example. When the node I is used as a base point to cancel the selection, a route from the node G to the edge (5) is reset. Namely, the node I, the link (a8), the link (g), and the edge (5) are canceled. It should be noted that settings can be made to another branch route after the canceling of selection.

As described above, the present invention controls views on a service-wise basis when a plurality of services are provided by a network. Further, when a failure occurs, it is easy to evaluate whether the failure affects services, making it easier to layout a countermeasure for the failure. Moreover, the preset invention provides a means that allows connection settings to be easily made with respect to each service, and absorbs differences in device types when multi-vendor network elements are used. Such means makes it easier to add/delete an object to be managed.

Further, the present invention is not limited to these embodiments, but various variations and modifications may be made without departing from the scope of the present invention.

The present application is based on Japanese priority application No. 11-003645 filed on Jan. 11, 1999, with the Japanese Patent Office, the entire contents of which are hereby incorporated by reference.

What is claimed is:

1. A method of controlling a network which includes a plurality of network elements connected via a plurality of links, and provides a plurality of communications services to end-users of the network, said method comprising the steps of:

creating view-configuration information based on network-configuration information with respect to each of the plurality of communications services such that the view-configuration information is related to the network-configuration information;

registering the view-configuration information and the network-configuration information in a database, said registered view-configuration information and registered network-configuration information being further capable of being updated;

creating a plurality of communications service-specific views of the network that correspond to respective one of the communications services, wherein each communications service-specific view includes ones of the plurality of networks elements and ones of the plurality of links that are required for providing an associated communications service to the end-users of the network;

displaying a selected one or more of the communications service-specific views by presenting each selected view based on the view-configuration information for respective one of the communications services, said selected view including both or either one of a plurality of a physical network configuration of the network and a logical network configuration of the network;

providing matches between failure levels and failure labels with respect to different types of failures, the failure levels indicating significance of failures either as physical failures or as communications service failures: and displaying a failure level of a failure occurring in the network in association with the displaying of the selected view.

2. The method as claimed in claim 1, wherein said step of creating includes the steps of:

selecting network elements and links from a network configuration represented by the network-configuration information; and creating the view-configuration information according to the selected network elements and links.

3. The method as claimed in claim 1, wherein said step of creating includes the steps of:

selecting a connection from a network configuration represented by the network-configuration information, and creating the view-configuration information according to the selected connection.

4. The method as claimed in claim 1, wherein said step of creating includes the steps of:

selecting ports of network elements from a network configuration represented by the network-configuration information; and creating the view-configuration information according to the selected ports.

5. The method as claimed in claim 1, wherein said step of creating includes the steps of:

specifying attribute conditions of connections; and creating the view-configuration information by extracting network elements and links relating to at least one connection that matches the specified attribute conditions.

6. The method as claimed in claim 1, wherein said step of creating includes the steps of:

specifying a communications service name; and creating the view-configuration information by extracting network elements and links relating to connections that provide the specified communications service name.

7. The method as claimed in claim 1, further comprising the steps of:

providing matches between failure levels and failure labels with respect to different types of failures, the failure levels indicating significance of failures either as physical failures or as communications service failures; and displaying a failure level of a failure occurring in the network in association with the displayed view.

8. The method as claimed in claim 7, further comprising the steps of:

controlling the failures by a unit of a node or a port of a node; and selecting a failure level of a connection by finding a largest failure level along the connection, and displaying the failure level of the connection in association with the displayed view.

9. The method as claimed in claim 1, further comprising a step of selecting nodes and links on the displayed physical network configuration to set a route between edges.

10. The method as claimed in claim 1, wherein said step of selecting includes the steps of:

selecting the edges on the displayed physical network configuration; and setting the route between the edges by extracting nodes and links so as to use as small a number of intervening edges and links between the selected edges.

11. The method as claimed in claim 1, wherein the view-configuration information is created such that network elements and links that are added during operation of the displayed communications services are added in real time to the selected one or more communications service-specific views.

12. A system for controlling a network including a plurality of network elements and a plurality of links, said system comprising:

a database which stores network-configuration information and view-configuration information such that the view-configuration information is related to the network-configuration information;

a service-management server which attends to registering and updating of the information stored in the database, and defines communications service-specific views of a physical network configuration and a logical network configuration with respect to each of a plurality of communications services provided to end-users of the network, based on the view-configuration information stored on said database, wherein each communications service-specific view includes ones of the plurality of network elements and ones of the plurality of links that that are required for providing an associated communications service to the end-users of the network;

a network-management server which collects information on configurations of the network elements and the links as well as information on failures, and informs said service-management server of a change in at least one of the configurations and the failures for a purpose of said updating; and a client which displays both or either one of the physical network configuration and the logical network configuration with respect to said client's own communications service by selecting one of the communications service-specific views that corresponds to said client's own communications service, wherein said network-management server includes a failure-level-conversion table that provides matches between failure levels and failure labels with respect to different types of failures, the failure levels indicating significance of failures either as physical failure or as communications service failures, and wherein the client displays a failure level of a failure occurring in the network in associated with the displaying of selected view.

13. The system as claimed in claim 12, wherein said service-management server includes a connection-setting unit which controls settings of a connection between edges based on the edges, nodes and links selected from the physical network configuration.

14. The system as claimed in claim 12, wherein the client adds network elements and links that are added during operation of the client's communications service to the display of the selected communications service-specific view in real time.

15. A method of controlling a network which includes a plurality of network elements connected via a plurality of links, and provides a plurality of communications services to end-users of the network, said method comprising the steps of:

creating view-configuration information based on network-configuration information with respect to each of the plurality of communications services such that the view-configuration information is related to the network-configuration information;

registering the view-configuration information and the network-configuration information in a database, said registered view-configuration information and registered network-configuration information being further capable of being updated;

creating a plurality of communications service-specific views of the network that correspond to respective one of the communications services, wherein each communications service-specific view includes ones of the plurality of networks elements and ones of the plurality of links and ones of a plurality of logical links that are required for providing an associated communications service to the end-users of the network;

displaying a selected one or more of the communications service-specific views by presenting each selected view based on the view-configuration information for respective one of the communications services, said selected view including both or either one of a plurality of a physical network configuration of the network and a logical network configuration of the network;

providing matches between failure levels and failure labels with respect to different types of failures, the failure levels indicating significance of failures either as physical failures or as communications service failures; and displaying a failure level of a failure occurring in the network in association with the displaying of the selected view.

\* \* \* \* \*